United States Patent Office 2,723,236
Patented Nov. 8, 1955

2,723,236

LUBRICANTS

Peter A. Asseff, Cleveland, Thomas W. Mastin, Willoughby, and Alan Rhodes, Euclid, Ohio, assignors to The Lubrizol Corporation, Wickliffe, Ohio, a corporation of Ohio No Drawing. Application November 3, 1952,
Serial No. 318,523

4 Claims. (Cl. 252—32.7)

This invention relates to organic metal complexes and novel methods for the production of such complexes.

It is now well known that when preparing a salt or soap of an organic acid, the mere use of an excess of neutralizing agent, which in the prior art has been in the form of the oxide, hydroxide, carbonate, etc. of the desired metal, may result in a product which contains an amount of metal in excess of that theoretically required to replace the acidic hydrogens of the organic acid used as the starting material.

Work with this type of product has shown that for many uses, particularly where extreme care must be exercised to prevent the composition from being corrosive, as for example in lubricants, desirable results are secured by the use of these organic metal complexes.

Materials containing an excess amount of metal prepared by earlier workers in the art can be divided into three types. In the first type, an excess of alkali was cooked into the mixture. This can be illustrated by the McNab Patent No. 2,418,894. In the second type, illustrated by patents to Griesinger No. 2,402,325, Campbell et al. No. 2,485,861, and Mertes No. 2,501,731, the excess metal was held in solution of colloidal suspension. A peptizing agent, such as a sulfonate, was employed to peptize a metal hydroxide or carbonate. In the third type, illustrated by the patents to McLennan Nos. 2,417,428 to 2,417,433, oil-insoluble metal complexes were prepared by complexing a high molecular weight soap with either a normally oil-insoluble organic salt or molecularly equivalent proportions of an oil-insoluble organic salt and an oil-insoluble inorganic salt. McLennan sought to produce an insoluble lattice to aid in thickening oils to produce greases. All of his specific compositions and working examples are greases.

In the present invention it has been found that a fully oil-soluble organic metal complex can be produced with a high metal content by complexing an oil-soluble salt (hereinafter for convenience referred to as an oilsalt) with a combination, in certain critical proportions, of normally oil-insoluble organic and inorganic salts (hereinafter for convenience referred to as aquasalts).

It is a principal object of the invention to provide oil-soluble metal complexes, and processes for preparing the same, of the type referred to above.

It is understood for the purpose of the specification and claims that the term "oilsalt" refers to an oil-soluble alkaline earth metal salt of an organic acid. The term "aquasalt" refers to oil-insoluble alkaline earth metal salt. For a more detailed definition and explanation of oilsalts and aquasalts, see the sections, infra, entitled, "Acids useful in preparation of oilsalts," "Materials useful in preparation of organic aquasalts," and "The initial inorganic aquasalt used in the process."

For the purpose of the present specification and claims, the ratio of total equivalents of metal in the complex to equivalents of oilsalt therein will be referred to as the "metal ratio."

Broadly stated the invention comprises an oil-soluble organic alkaline earth metal complex which has in chemical combination at least one oilsalt and a plurality of aquasalts; said aquasalts consisting of at least one organic aquasalt derived from salt-forming compounds having an ionization constant in water of at least $1 \times 10^{-10}$ at 25° C., water-solubilities of at least about 0.0005% at 50° C., and saturated aqueous solutions of which at about 25° C. exhibit a pH of less than 7; and at least one inorganic aquasalt, the amount of said inorganic aquasalt present in said complex being substantially greater than the amount of said organic aquasalt present; and the ratio of equivalents of said organic aquasalt to equivalents of said oilsalt being from 0.01 to 10.

Throughout this specification and in the appended claims we restrict the alkaline earth metals to the conventional group which includes only strontium, barium and calcium and which does not include magnesium or radium.

By use of a single empirical formula the complexes of the present invention can be represented as follows:

$$Q—M_z(AO)_y(AI)_x$$

wherein:

Q = one hydrogen equivalent of the anion of at least one oilsalt;

M = one hydrogen equivalent of at least one alkaline earth metal;

AO = one hydrogen equivalent of the anion of at least one organic aquasalt formed from at least one salt-forming compound having an ionization constant in water of at least $1 \times 10^{-10}$ at 25° C., a water-solubility of at least about 0.0005% at 50° C., and saturated solution of which at about 25° C. exhibit a pH of less than 7;

AI = one hydrogen equivalent of the anion of at least one inorganic aquasalt;

z = the total number of equivalents of metal in the complex;

x = the total number of equivalents of AO in the complex;

y = the total number of equivalents of AI in the complex;

and in which $z = x - y - 1$, and the ratio $x/y$ is substantially greater than 1.

There are various processes which may be utilized to produce the complexes comprising our invention as defined above. One process which may be so utilized for this purpose may be defined as the process of preparing a substantially entirely oil-soluble organic alkaline earth metal complex which comprises:

I. Mixing one hydrogen equivalent of an organic acid compound with:
  (a) From 0.1 to 10 equivalent of low molecular weight organic salt-forming compound having:
    (1) An ionization constant in water of at least about $1 \times 10^{-10}$ at 25° C.;
    (2) A water solubility at 50° C. of at least about 0.0005%, and
    (3) In saturated aqueous solutions about 25° C. a pH of less than 7;
  (b) An amount of an alkaline earth metal base in substantial excess of twice the number of hydrogen equivalents of said low molecular weight organic salt forming compound used; and
  (c) At least 0.5 mole of water, including any water of hydration in (a), and (b), II. Heating the mass for such time and temperature as to remove substantially all the water present, III. Treating the mass with at least one inorganic acid reagent in an amount sufficient to neutralize at least a portion of the titratable basicity of the mass.

Various specific embodiments of the process as broadly defined above are illustrated by specific examples in our aforesaid copending application Serial Nos. 216,101–3; 224,458; 263,961–3. Still another process by which these complexes may be produced is disclosed in and forms the subject matter of our copending application.

In one pair of experiments, a comparison was made between a process capable of producing a complex of the present invention, Example 1, and a representative prior art process, Example 2, using duplicate amounts of components. It is evident from the following examples that this invention will give substantially better results with respect to metal concentration of the complex than is obtained by conventional techniques. It is also apparent that the complex of this invention has a different chemical structure than the structure of conventional metal complexes.

EXAMPLE 1

1530 grams of a 30% oil solution of barium petroleum sulphonate having a 7.6% sulphate ash, 88 grams of para-tertiary butyl phenol (ratio of equivalents is 1.7), 271 grams of BaO and 725 ml. of water were mixed together at 60–70° C. The temperature of the mixture was raised to 100–105° C. and held there for one hour while insuring thorough mixing. Thereafter the temperature was raised to 150–160° C. and held at that level to remove substantially all the water. The complex was separated by filtration and had the following analyses:

Basic No. ---------------------------------- 85.2
Per cent sulphate ash ----------------------- 25.5
Metal ratio --------------------------------- 4.12
Empirical formula, $QM_{4.12}(AO)_{0.59}(AI)_{2.53}$

EXAMPLE 2

1530 grams of a 30% oil solution of barium petroleum sulphonate having a 7.6% sulphate ash were mixed with 725 ml. of water at about 60° C. Then 271 grams of BaO were added. The temperature of the mixture was raised to 100–105° C. and held there for one hour while insuring thorough mixing. Thereafter the temperature was raised to 150–160° C. and held there for one hour to substantially remove all the water. The complex was separated by filtration and had the following properties.

Basic No. ---------------------------------- 36.0
Per cent sulphate ash ----------------------- 15.34
Metal ratio --------------------------------- 2.14

This product, made essentially according to the teaching of Mertes 2,501,731, contained only about half the equivalent amount of metal as our product Example 1.

By a large number of specific examples we will illustrate various methods of preparation and examples of complexes which comprise the present invention.

EXAMPLE 3

1000 grams of the barium salt of unsaturated paraffin wax sulphonic acid containing 13.1% sulphate ash were mixed with 455 grams of a mineral oil having a viscosity of 160 SUS at 100° F. and 84.5 grams of para-tertiary-butyl phenol (ratio of equivalents is 2.0) placed in a suitable vessel and heated to about 95° C. with stirring. To this mixture was added a slurry of barium oxide (containing 269 grams of barium oxide and 920 grams of water) and the total mixture was heated about 100° C. for one hour. The temperature was slowly raised to about 150° C. and held there for about one hour until substantially all of the water was removed. Then about 3% Hyflow (a filter-aid) was added to the product to facilitate filtering. The salt complex was then separated by filtration. The salt complex thus prepared had the following properties:

Basic No. ---------------------------------- 53.8
Per cent sulphate ash ----------------------- 26.5
Metal ratio --------------------------------- 2.49
Empirical formula, $QM_{2.49}(AO)_{0.50}(AI)_{0.99}$

SOLUBILITY

| Solvent | Percent of Product added | Initial Appearance | Appearance after 1 week | Appearance after 1 month |
|---|---|---|---|---|
| Pa. 150 Neutral Oil | 50 | Clear | Clear | Clear. |
| Do | 10 | ---do--- | ---do--- | Do. |
| Do | 1 | ---do--- | ---do--- | Do. |

The salt complex product was fluid, brown in color and did not contain any odor.

EXAMPLE 4

1000 grams of the barium salt of mono-paraffin wax substituted naphthalene sulphonic acid containing 8.63% sulphate ash were mixed with 445 grams of mineral oil having a viscosity of 160 SSU at 100° F. and 54.6 grams of para-tertiary-butyl phenol (ratio of equivalents is 2.0) and heated to about 90° C. A slurry of barium oxide (203.5 grams of barium oxide and 543 grams of water) was added, and the mixture was heated for two hours at the reflux temperature, and then dehydrated at about 165° C. for a period of one hour. Hyflow was then added to the product and the salt complex was recovered by filtration. The salt complex contained the following properties:

Basic No. ---------------------------------- 44.1
Per cent sulphate ash ----------------------- 17.9
Metal ratio --------------------------------- 2.37
Empirical formula, $QM_{2.37}(AO)_{0.50}(AI)_{.87}$

EXAMPLE 5

400 grams of the barium salt of mono-paraffin wax substituted naphthalene sulphonic acid disulphide containing 8.2% sulphate ash and 27 grams of para-tertiary-butyl phenol were placed in a suitable vessel and heated to 90° C. (ratio of equivalents is 1.54). A barium oxide slurry constituting 66.5 grams of barium oxide and 180 cc. of water was added to the mixture and refluxed for about one hour. The temperature was then slowly raised to about 160° C. over a period of about four hours and held at that level for about 1.5 hours until substantially all of the water was removed. The salt complex was separated by filtering. The product was a viscous liquid, black in color, and contained a very slight odor. The following properties were determined for the salt complex:

Basic No. ---------------------------------- 69.7
Per cent sulphate ash ----------------------- 24.3
Metal ratio --------------------------------- 3.50
Empirical formula, $QM_{3.5}(AO)_{0.65}(AI)_{1.85}$

EXAMPLE 6

6,000 grams of a 30% by weight oil solution of barium petroleum sulphonate (sulphate ash content 7.6%) were mixed with 348 grams of para-tertiary-butyl phenol in a 12-liter, 3-neck flask (ratio of equivalents 1.7) and heated to 95° C. A slurry of barium oxide constituting 1,100 grams of barium oxide and 2,911 grams of water was then added and the mixture held there for about one hour at a temperature of about 90–95° C. The total mixture was then slowly raised in temperature to 150° C. and dehydrated at that temperature over a period of about 4½ hours. The salt complex was separated by filtration and was found to be a slightly viscous liquid, black in color, and did not contain any odor. The properties of the salt complex were as follows:

Basic No. ---------------------------------- 72.1
Per cent sulphate ash ----------------------- 23.1
Metal ratio --------------------------------- 3.59
Empirical formula, $QM_{3.59}(AO)_{0.59}(AI)_{2.0}$

EXAMPLE 7

405 grams of di-(2-ethyl hexyl) dithiophosphoric acid, 308 grams of iso-nonyl phenol (ratio of equivalents 1.52)

and 473 grams of solvent extracted Mid-Continent oil having a viscosity of 160 SUS at 100° F. were mixed together and heated to 50° C. A slurry comprising 387 grams of BaO and 1,030 cc. of water was added quickly, maintaining the temperature at about 65° C. The mixture was then heated to 100° C. and held there for one hour. Then the temperature was raised to 150° C. over a period of 2½ hours and held there for one hour. The product was obtained by filtering the mass and was found to be a slightly viscous liquid, red in color, and contained a slight odor. The following properties were determined for the product:

| | |
|---|---|
| Basic No | 76.0 |
| Per cent barium | 20.0 |
| Per cent sulphate ash | [1] 34.0 |
| Metal ratio | 3.65 |

Empirical formula, $QM_{3.65}(AO)_{0.658}(AI)_{1.99}$

[1] Calculated from metal content.

EXAMPLE 8

777 grams of di-(2-ethyl hexyl) dithiophosphoric acid, 308 grams of iso-nonyl phenol (ratio of equivalents 1.52) and 914 grams of solvent extracted Mid-Continent oil having a viscosity of 160 SUS at 100° F. were mixed together, followed by an addition of BaO slurry consisting of 773 grams of BaO and 2,060 cc. of $H_2O$, while keeping the temperature below 65° C. The total mixture was then heated at 100° C. for one hour, followed by a raise in temperature to 150° C. over a period of 2½ hours, and maintained at that level for one hour. The desired product was a slightly viscous liquid, red in color, and contained a slight odor. The product had the following properties:

| | |
|---|---|
| Basic No | 78.0 |
| Per cent barium | 22.7 |
| Per cent sulphate ash | [1] 38.6 |
| Metal ratio | 4.52 |

Empirical formula, $QM_{4.52}(AO)_{0.658}(AI)_{2.86}$

[1] Calculated from metal content.

EXAMPLE 9

172 grams of di-(n-hexyl) dithiophosphoric acid, 500 grams of petroleum sulphonic acid, 159 grams of iso-nonyl phenol (ratio of equivalents of oil soluble acids to iso-nonyl phenol is 1.52), and 1,170 cc. of water were mixed together, then 437 grams of BaO were added over a period of ½ hour. The mixture was heated at reflux temperature for 1 hour, followed by heating to 150° C. over a period of 2½ hours, then maintaining that temperature for 1 hour. The desired product was a viscous liquid, brown in color, and contained a slight odor. The following properties were determined:

| | |
|---|---|
| Basic No | 87.1 |
| Per cent barium | 28.6 |
| Per cent sulphate ash | [1] 48.8 |
| Metal ratio | 5.22 |

Empirical formula, $QM_{5.22}(AO)_{0.658}(AI)_{3.56}$

[1] Calculated from metal content.

EXAMPLE 10

172 grams of di-(n-hexyl) dithiophosphoric acid, 500 grams of petroleum sulphonic acid and 98 grams of para-tertiary-butyl phenol (ratio of equivalents of oil soluble acids to para-tertiary-butyl phenol is 1.52) were mixed together. To this mixture was added a slurry of 387 grams of BaO and 1,080 cc. of water. The mixture was heated at 100° C. for one hour, and then the temperature was raised to 150° C. and held at that level for one hour. The product was a highly viscous liquid, brown in color, and contained a slight odor. The following properties of the product were determined:

| | |
|---|---|
| Basic No | 121 |
| Per cent barium | 30.05 |
| Per cent sulphate ash | [1] 51.0 |
| Metal ratio | 5.36 |

Empirical formula, $QM_{5.36}(AO)_{0.658}(AI)_{3.78}$

[1] Calculated from metal content.

EXAMPLE 11

249 grams of petroleum naphthenic acid, 88.6 grams of para-tertiary butyl phenol (ratio of equivalents is 1.70), 1212 grams of a conventionally-refined Mid-Continent oil having a viscosity of 110 SUS at 100° F., 347 grams of BaO, and 700 ml. of $H_2O$ were placed in a 5 liter, 3-neck flask and heated to 100° C. with stirring. The mixture was held at 100–105° C. for 1 hour, and then the temperature was raised to 150–160° C. After holding the temperature for 1 hour at 150–160° C., the mixture was blown with $CO_2$ for ¾ hour, keeping the temperature at about 150–160° C. The mixture was then filtered with Hyflo, and the separated product had the following properties:

| | |
|---|---|
| Basic No | 1.98 |
| Per cent sulphate ash | 25.10 |
| Metal ratio | 4.10 |

Empirical formula, $QM_{4.10}(AO)_{0.067}(AI)_{3.93}$

A mixture of different oil-soluble metal sulphonates was treated in accordance with the method of the present invention to determine what effect if any the two types of sulphonates would have on the quality of the product. Such preparation is given in Example 12 below.

EXAMPLE 12

A mixture containing 500 grams of the barium salt of petrolatum sulphonic acid (sulphate ash 9.2%) 197 grams of the barium salt of petroleum sulphonic acid (sulphate ash 7.6%), and 50 grams of para-tertiary-butyl phenol (ratio of equivalents of the sulphonates to promoter is 1.54) was heated to 95° C. A slurry of barium oxide constituting 123 grams of barium oxide and 330 grams of water was added to the mixture. The total mixture was refluxed for one hour at 100° C. and then the temperature was slowly raised to 150° C. for a period of one hour to substantially remove all the water. The complex was separated by filtration and was found to be a liquid, and black in color. The following properties were determined:

| | |
|---|---|
| Basic No | 27.7 |
| Per cent sulphate ash | 17.25 |
| Metal ratio | 2.41 |

Empirical formula, $QM_{2.41}(AO)_{0.649}(AI)_{0.76}$

While most of the examples given herein use either a neutral or normal salt of the organic acid as a starting material to produce the high metal content complex, nevertheless, it is contemplated for the purposes of this invention to employ the complexes produced by conventional techniques as a starting material. The following example illustrates this concept:

EXAMPLE 13

1634 grams of a barium petroleum sulphonate-BaO complex (obtained by dehydrating a barium petroleum sulphonate, 7.6% sulphate ash, water and BaO mixture at 150° C. for one hour, and producing a complex which has a basic number of 40, metal ratio of 2.25 and 16% sulphate ash) and 121 grams of di-isobutyl-phenol (ratio of equivalents 1.7) were combined and heated to 70° C.

To this mixture was added 665 cc. of water, followed by a slow addition of 175 grams of BaO. The entire mixture was then refluxed for one hour, and the temperature was raised to 150° C. over a three hour period and held there for one hour. Prior to filtering, the mass was blown with $CO_2$ at a rate of 3.6 cubic feet/hr. for 1½ hours at 150° C. The product analyzed as follows:

Basic No_____ 8.67
Per cent sulphate ash_____ 24.8
Metal ratio_____ 4.13
Empirical formula, $QM_{4.13}(AO)_{0.30}(AI)_{2.83}$ It can be seen from the sulphate ash analyses of the product and overbased sulphonate used as starting material that there was an increase from 16.0 to 24.8 in sulphate ash. Clearly, therefore, the conventionally overbased materials can be used as starting materials in the present invention.

Other experiments were conducted in order to determine the effect of a higher dehydration temperature in the preparation of the salt complex of the present invention. In this respect, Examples 14 and 15 below illustrate the effect of higher temperature.

EXAMPLE 14

2000 grams of a 30% oil solution of barium petroleum sulphonate (sulphate ash 7.6%) were mixed with 120 grams of para-tertiary-butyl phenol (1.52 ratio of equivalents) and heated to 95° C. To said mixture was added a slurry of barium oxide containing 520 grams of barium oxide and 1390 ml. of water. The total mixture was heated for one hour at 100° C. and then was slowly raised in temperature over a period of three hours to 200° C. The mixture was maintained at this high temperature for a period of one-half hour. The salt complex was separated by filtering and was found to be an oily liquid, reddish-brown in color, and contained a faint odor. The following properties were determined:

Basic No_____ 71.5
Per cent sulphate ash_____ 24.3
Metal ratio_____ 3.80
Empirical formula, $QM_{3.80}(AO)_{0.658}(AI)_{2.14}$

EXAMPLE 15

2036 grams of 30% oil solution of barium petroleum sulphonate (sulphate ash 7.6%) were mixed with 74.5 grams of phenol (1.67 ratio of equivalents) and heated to 100° C. A barium oxide slurry containing 483 grams of barium oxide and 1290 ml. of water was added and the mixture refluxed slowly for a period of one hour at 100° C. The mixture was then dehydrated by heating slowly to 200° C. and maintaining such a temperature for a period of about one-half hour. The salt complex was separated by filtration and was found to be an oily liquid, reddish-brown in color, and contained a slight odor. The following properties were determined for the complex:

Basic No_____ 111.5
Per cent sulphate ash_____ 32.8
Metal ratio_____ 5.56
Empirical formula, $QM_{5.56}(AO)_{0.598}(AI)_{3.96}$

EXAMPLE 16

A mixture of 2280 grams of a 30% oil solution of barium petroleum sulphonate (sulphate ash 7.6%) and 83 grams of phenol (ratio of equivalents is 1.53) was heated to a temperature of 60° C. 496 grams of barium oxide and 1300 grams of water were added to the above mixture and the temperature was raised to 90–100° C. After holding at said temperature for one hour, the temperature was raised over a period of three hours to 150° C. and held at that level for one-half hour. The resultant salt complex was fluid in consistency and dark red in color. The following properties were determined:

Basic No_____ 91.4
Per cent sulphate ash_____ 26.8
Metal ratio_____ 4.37
Empirical formula, $QM_{4.37}(AO)_{0.654}(AI)_{2.72}$

EXAMPLE 17

80 grams of tertiary-butyl benzene was reacted with 71 grams of chlorosulphonic acid at a temperature of 30–40° C. for a period of one hour. The resultant product, tertiary-butyl benzene sulphonic acid, was dissolved in a little warm water and admixed with 1550 grams of a 30% oil solution of barium petroleum sulphonate (ratio of equivalents of sulphonate to sulfonic acid is 1.52). The mixture was heated to 90° C., whereupon 284 grams of barium oxide and 760 ml. of water were added. The mixture was stirred for one hour at a temperature of 100–102° C. The temperature was thereupon raised to 200° C. for a short period and then reduced to 150° C. and held at that level for a period of one hour. The salt complex thus obtained was an oily liquid, reddish-brown in color, and contained a faint odor. The properties of the product are as follows:

Basic No_____ 64.7
Per cent sulphate ash_____ 27.0
Metal ratio_____ 4.73
Empirical formula, $QM_{4.73}(AO)_{0.654}(AI)_{2.08}$

EXAMPLE 18

2500 grams of 30% oil solution of barium petroleum sulphonate (sulphate ash 7.6%) were admixed with 173 grams of para-tertiary-butyl benzoic acid (1.68 ratio of equivalents) and heated to 95° C. 458 grams of barium oxide and 1215 grams of water were added to the mixture and the temperature was maintained at 100° C. for about one hour. Thereafter the temperature was slowly raised to 150° C. and maintained at that level for a period of one hour. The salt complex was filtered from the total mixture and was an oily liquid, brown in color and contained a faint odor. The following properties were determined:

Basic No_____ 32.1
Per cent sulphate ash_____ 19.1
Metal ratio_____ 2.88
Empirical formula, $QM_{2.88}(AO)_{0.594}(AI)_{1.29}$

EXAMPLE 19

630 grams of a 30% oil solution of barium petroleum sulphonate (7.6% sulphate ash) were admixed with 350 grams of nitroparaffin wax (ratio of equivalents is 0.59). Then 760 cc. of water was added, followed by the addition of 296 grams of BaO. For one hour the mixture was agitated at 90–100° C., whereupon the temperature was raised to 150° C. and held at that level for one hour. The mixture was filtered, and the complex obtained had the following properties:

Basic No_____ 132
Per cent sulphate ash_____ 33.3
Metal ratio_____ 6.47
Empirical formula, $QM_{6.47}(AO)_{1.69}(AI)_{3.76}$

EXAMPLE 20

2050 grams of a 30% oil solution of barium petroleum sulphonate (sulphate ash 7.6%) were admixed with 73.5 grams of 1-nitro-propane (ratio of equivalents is 1.62) and heated to a temperature of 95° C. 388 grams of barium oxide and 1035 ml. of water were added to the mixture and the temperature was maintained for a period of one hour at 100° C. Thereafter the temperature of the mixture was slowly raised to 150° C. over a period of 2½ hours and maintained at that level for a period of one hour. The product was an oily liquid, reddish-brown in color, and contained a slight odor. The following properties were determined for the product:

Basic No_____ 78.2
Per cent sulphate ash_____ 28.2
Metal ratio_____ 4.60
Empirical formula, $QM_{4.60}(AO)_{0.617}(AI)_{2.98}$

EXAMPLE 21

1500 grams of a 30% oil solution of barium petroleum sulphonate having a sulfate ash of 7.6%, 93 grams of iso-propyl phenol (ratio of equivalents 1.7), and 670 grams of water were placed in a 3-liter flask and heated to 60° C. 250 grams of BaO were then added, the temperature was allowed to rise to 100° C. The mixture was held at 100° C. for one hour, followed by a rise in temperature to 150° C. over a two hour period, where the temperature was held for one-half hour. The total mixture was filtered, and the filtered product had the following properties:

Basic No. _____ 87.8
Per cent sulphate ash _____ 25.95
Metal ratio _____ 3.88
Empirical formula, $QM_{2.88}(AO)_{0.59}(AI)_{2.29}$

EXAMPLE 22

1140 grams of a 30% oil solution of barium petroleum sulphonate having a sulphate ash of 7.6% and 80 grams of para-tertiary-amyl phenol (ratio of equivalents 1.54) were heated to 70° C. Thereafter 600 cc. of water were added, followed by a slow addition of 227 grams of BaO. The mixture was refluxed for one hour, and then the temperature was raised to 160° C. over a period of four hours and held there for one-half hour. The product was separated by filtration, and had the following analyses:

Basic No. _____ 85.5
Per cent sulphate ash _____ 24.60
Metal ratio _____ 3.96
Empirical formula, $QM_{3.96}(AO)_{0.65}(AI)_{2.31}$

EXAMPLE 23

2583 grams of a 30% oil solution of barium petroleum sulphonate having a 7.6% sulphate ash, 144.2 grams of beta-naphthol (ratio of equivalents is 1.69) and 1262 ml. of water were combined and mixed thoroughly. Then 472 grams of BaO were added over a one hour period, followed by maintaining the total mixture at 100° C. for one hour. The temperature was then raised to 150° C. and held there for one hour. Prior to filtering the mixture, it was blown with $CO_2$ for 75 minutes at which time the mixture was slightly basic. After filtering, the product analyzed as follows:

Basic No. _____ 4.88
Per cent sulphate ash _____ 23.8
Metal ratio _____ 3.90
Empirical formula, $QM_{3.90}(AO)_{0.17}(AI)_{2.73}$

EXAMPLE 24

1530 grams of a 30% oil solution of barium petroleum sulphonate having a 7.6% sulphate ash, 129 grams of iso-nonyl phenol (ratio of equivalents is 1.7) and 727 ml. of water were combined and thoroughly mixed. Then 271 grams of BaO were added and the total mixture was held at 100° C. for one hour. The temperature was then raised to 150–160° C. and held there for one hour. Prior to filtering, the mass was blown at about 150° C. with $CO_2$ until the mixture was slightly basic. The filtered product analyzed as follows:

Basic No. _____ 3.9
Per cent sulphate ash _____ 25.0
Metal ratio _____ 4.17
Empirical formula, $QM_{4.17}(AO)_{.14}(AI)_{3.03}$

EXAMPLE 25

2600 grams of a 30% solution of barium petroleum sulphonate having a 7.6% sulphate ash, 215 grams of tertiary-butyl chlorophenol (ratio of equivalents is 1.7) and 1265 cc. of water were combined, followed by an additional 459 grams of BaO. The temperature of the total mixture was raised to 100° C. and held there for one hour. Then the temperature was raised to 150° C. where it was held for one hour. Prior to filtering the mixture, it was blown for three hours with $CO_2$ at 135–145° C. until the mixture was slightly basic. The filtered product analyzed as follows:

Basic No. _____ 13.3
Per cent sulphate ash _____ 25.45
Metal ratio _____ 4.38
Empirical formula, $QM_{4.38}(AO)_{0.48}(AI)_{2.90}$

EXAMPLE 26

1530 grams of a 30% oil solution of barium petroleum sulphonate having a 7.6% sulphate ash and 131 grams of methyl naphthalene sulphonic acid (ratio of equivalents is 1.7) were combined and heated to 70° C. 725 grams of water were added to the mixture, followed by a slow addition of 271 grams of BaO. The entire mixture was refluxed for one hour, then the temperature was raised to 150° C. over a three hour period, and held there for one hour. Prior to filtering, the mass was blown with $CO_2$ at a rate of 3.6 cu. ft./hr. for 1½ hours at 150° C. The filtered product analyzed as follows:

Basic No. _____ Nil
Per cent sulphate ash _____ 25.9
Metal ratio _____ 4.41
Empirical formula, $QM_{4.41}(AO)_{0.59}(AI)_{2.82}$

EXAMPLE 27

1530 grams of a 30% oil solution of barium petroleum sulphonate having a 7.6% sulphate ash, 113 grams of di-isobutenyl sulphonic acid (ratio of equivalents is 1.7) and 725 grams of $H_2O$ were combined and heated to 70° C. To this mixture were added 271 grams of BaO, and the entire mixture was heated at 100° C. for one hour. The mixture was then heated at 150° C. for one hour, followed by blowing with $CO_2$ at 150° C. prior to filtering, to obtain a substantially neutral mass. The filtered product analyzed as follows:

Basic No. _____ 0.23
Per cent sulphate ash _____ 24.6
Metal ratio _____ 4.10
Empirical formula, $QM_{4.10}(AO)_{0.59}(AI)_{2.51}$

EXAMPLE 28

Di-isopropyl benzene sulphonic acid obtained by reacting 162 grams of di-isopropyl benzene with 122 grams of chloro sulphonic acid for one hour at 100° C. were combined with 2600 grams of a 30% oil solution of barium petroleum sulphonate having a 7.6% sulphate ash and 1220 ml. of water. The ratio of equivalents of oil soluble sulphonate to sulphonic acid is 1.7. Then 471 grams of BaO were added slowly and the mixture held at 100° C. for one hour. Prior to filtering, the mixture was blown with $CO_2$ for one half hour at 120–140° C. The filtered product analyzed as follows:

Acid No. _____ 1.22
Per cent sulphate ash _____ 25.4
Metal ratio _____ 4.33
Empirical formula, $QM_{4.33}(AO)_{0.59}(AI)_{2.74}$

EXAMPLE 29

Cymene sulphonic acid obtained by reacting 134 grams of cymene with 122 grams of chlorosulphonic acid at 70–100° C. for 1½ hours were combined with 2600 grams of a 30% oil solution of barium petroleum sulphonate having a 7.6% sulphate ash and 1220 ml. of water. The ratio of equivalents of oil soluble sulphonate to sulphonic acid is 1.7. To this mixture was added 461 grams of BaO, and the entire mixture was then held at 85–100° C. for one hour. Then the temperature was raised to 150° C. and held there for one hour. Prior to filtering, the mass was blown $CO_2$ for one-half hour at 130° C. The filtered product analyzed as follows:

Acid No._____ 0.95
Per cent sulphate ash_____ 25.8
Metal ratio_____ 4.38

Empirical formula, $QM_{4.38}(AO)_{0.59}(AI)_{2.79}$

EXAMPLE 30

2600 grams of a 30% oil solution of barium petroleum sulphonate having a 7.6% sulphate ash, 2219 grams of tertiarybutyl dichlorophenol (ratio of equivalents is 1.7) and 1265 grams of water were combined, followed by an addition of 459 grams of BaO over a 45 minute period. The entire mixture was held at 100° C. for one hour, followed by maintaining the temperature at 150° C. for one hour. Prior to filtering, the mass was blown with $CO_2$ for 90 minutes at 135–150° C. until it was slightly basic. The filtered product analyzed as follows:

Basic No._____ 6.45
Per cent sulphate ash_____ 23.2
Metal ratio_____ 3.85

Empirical formula, $QM_{3.85}(AO)_{0.22}(AI)_{2.63}$

EXAMPLE 31

2600 grams of a 30% oil solution of barium petroleum sulphonate having a 7.6% sulphate ash, 236 grams of di-isopropyl dithiophosphoric acid (ratio of equivalents is 1.7) and 1220 ml. of water were combined, followed by a slow addition of 461 grams of BaO. The mixture was held at 100° C. for one hour, and then heated to 150° C. and held there for one hour. Prior to filtering, the mass was blown with $CO_2$ for 20 minutes at 125–150° C. The filtered product analyzed as follows:

Acid No._____ 0.27
Per cent barium_____ 14.25
Per cent sulphate ash_____ ¹24.2
Metal ratio_____ 4.15

Empirical formula, $QM_{4.15}(AO)_{0.59}(AI)_{2.56}$

¹ Calculated from metal content.

EXAMPLE 32

2580 grams of a 30% oil solution of barium petroleum sulphonate having a 7.6% sulphate ash, 99 grams of acetyl-acetone (ratio of equivalents is 1.7) and 1260 cc. of water were combined, followed by a slow addition of 455 grams of BaO over a one hour period. The entire mixture was held at 94° C. for one hour, followed by a one hour period of heating at 150° C. Prior to filtering, the mass was blown with $CO_2$ for one hour at 135–150° C. The filtered product analyzed as follows:

Basic No._____ 3.2
Per cent sulphate_____ 22.7
Metal ratio_____ 3.48

Empirical formula, $QM_{3.48}(AO)_{0.10}(AI)_{2.38}$

EXAMPLE 33

1530 grams of a 30% oil solution of barium petroleum sulphonate having a 7.6% sulphate ash and 206 grams of di-t-butyl naphthalene sulphonic acid (ratio of equivalents is 1.7) were combined and heated to 70° C. 725 grams of water were then added, followed by a slow addition of 271 grams of BaO. The mixture was refluxed for one hour, and held at 150° C. for one hour. Prior to filtering, the mixture was blown with $CO_2$ at a rate of 3.6 cu. ft./hr. for 1.25 hours at a temperature of 150° C. The filtered product analyzed as follows:

Acid No._____ 0.24
Per cent sulphonate ash_____ 23.6
Metal ratio_____ 4.12

Empirical formula, $QM_{4.12}(AO)_{0.59}(AI)_{2.53}$

The salt complex can also be prepared by starting with the oil-soluble sulphonic acid and treating with an organic salt forming compound from which the organic aquasalt is derived and the inorganic metal compound. This technique differs from those given above because as shown in all the above examples, the normal metal sulphonate or conventionally overbased sulphonate was employed as a starting material. In order to demonstrate that the metal ratio of the salt complex obtained by this method is greater than by conventional techniques, a comparison was made with a conventional technique in which the acid was employed as a starting material. In this respect, Example 34 below is illustrative.

EXAMPLE 34

The oil-soluble petroleum sulphonic acid employed in this test was derived by reacting a 60% oil solution of sodium petroleum sulphonate with the stoichiometric amount of sulfuric acid (96% strength) at a temperature of 60–70° C. for a period of two hours. After allowing the reaction mixture to stand about 12 hours, it was filtered twice through a glass cloth. 2,875 grams of the product just described were combined with 205.7 grams of para-tertiary-butyl phenol (ratio of equivalents is 1.39), 1,647 grams of a low-viscosity mineral oil having a viscosity of about 120 SUS at 100° F., 927.6 grams of barium oxide and 2,480 grams of water and heated for one hour at a temperature of 98° C. The mixture was then dehydrated for one hour at a temperature of 150° C. so as to remove substantially all of the water. The product was a viscous liquid, brown in color, and contained a mild odor. The following properties were determined for the desired product:

Basic No._____ 74.2
Percent sulphate ash_____ 24.4
Metal ratio _____ 4.02

Empirical formula, $QM_{4.02}(AO)_{0.72}(AI)_{2.30}$

The salt complexes of the present invention can be prepared by first adding water to the mixture of the oil-soluble metal sulphonate or sulphonic acid and the organic compound corresponding to the aquasalt, and then adding the inorganic metal compound in a dry state. In this respect, Example 35 given below illustrates an alternative method by which the salt complex can be prepared.

EXAMPLE 35

1,000 grams of the barium salt of di-paraffin wax subsituted phenol sulphonic acid (sulphate ash 6.6%) were admixed with 55 grams of para-tertiary-butyl phenol (ratio of equivalents is 1.54) and heated to a temperature of 90° C. 800 cc. of water were then added. The mixture was mixed thoroughly and then 300 grams of dry barium oxide were added. The total mixture was refluxed for two hours followed by an additional 573 grams of a mineral oil having a viscosity of 160 SUS at 100° F. The temperature was raised over a period of four hours to 170° C. and then maintained there one hour. The salt complex was obtained by filtering the product and was found to be a viscous liquid, dark brown in color, and contained a faint odor. The following properties were determined for the salt complex:

Basic No._____ 67.8
Percent sulphate ash_____ 23.8
Metal ratio _____ 6.67

Empirical formula, $QM_{6.67}(AO)_{0.65}(AI)_{5.02}$

Another experiment was performed in which the preformed organic aquasalt was added to the process mass. Example 36 below illustrates this feature of the invention.

EXAMPLE 36

1,700 grams of a 30% oil solution of barium petroleum sulphonate (sulphate ash 7.6%) were admixed with 105 grams of barium phenate (ratio of equivalents is 1.70), and 570 grams of water. The mixture was heated to 75–100° C. whereupon 214 grams of barium oxide were added. The temperature of the mixture was maintained at 100° C. for one hour and then raised slowly to 150° C. and held at this level for a period of one hour. The salt complex was then separated by filtration and was found to be a viscous liquid, light brown in color, and contained a slight odor. The following properties were determined for the salt complex:

Basic No. _____ 68
Percent sulphate ash _____ 21.4
Metal ratio _____ 3.23
Empirical formula, $QM_{3.23}(AO)_{0.59}(AI)_{1.64}$ The following examples by comparison illustrate the substantial increase in metal content of the complex which is obtained by treating the mass with an acidic material before filtering to separate the desired product.

EXAMPLE 37

1,700 grams of a 30% oil solution of barium petroleum sulphonate having a sulphate ash of 7.6% were mixed with 134 grams of diisobutyl-phenol (ratio of equivalents is 1.7) and heated to 70° C. 302 grams of BaO and 800 cc. of water were added thereto, and the mixture was refluxed for one hour. The temperature was then raised to 160° C. over a period of 6 hours and maintained at that temperature for one hour. The mass was filtered and the product obtained was a liquid, brown in color, and contained a slight odor. The following properties of the products were determined:

Basic No. _____ 66
Percent sulphate ash _____ 22.2
Metal ratio _____ 3.64
Empirical formula, $QM_{3.64}(AO)_{0.59}(AI)_{2.05}$

EXAMPLE 38

1,700 grams of a 30% oil solution of barium petroleum sulphonate having a sulphate ash of 7.6% were mixed with 134 grams of diisobutyl-phenol (ratio of equivalents is 1.7) and heated to 70° C. Then 800 cc. of $H_2O$ and 302 grams of BaO were added and the mixture refluxed for one hour. The temperature was raised to 150° C. and maintained there for one hour. $CO_2$ was then injected therethrough at 150° C. and at a rate of 1,650 cc./min. for 38 minutes. The mass was then cooled and filtered to separate the complex. The product was liquid, brown in color, and contained a faint odor. The following properties of the product were determined:

Basic No. _____ 5.05
Percent sulphate ash _____ 26.0
Metal ratio _____ 4.52
Empirical formula, $QM_{4.52}(AO)_{0.22}(AI)_{3.30}$

EXAMPLE 39

400 lbs. of a 30% oil solution of barium petroleum sulphonate having a sulphate ash of 7.6% were heated to 80° C., and 32.5 lbs. of diisobutyl-phenol (ratio of equivalents is 1.67) were added thereto. Then 197 lbs. of water were added to the mixture, with stirring to insure thorough mixing. 73 lbs. of BaO were added thereto over a 30 minute period at 55–80° C. The mixture was agitated for about 10 minutes more at 80° C., then the temperature was raised to 100° C. and held there for one hour. Thereafter, the temperature was raised to about 150° C. and maintained at that level for one hour. Following this step, $CO_2$ was blown through the mass until about 75 lbs. thereof had been used over a period of three hours and at a temperature of 135–170° C. The mass was then filtered and the product was found to have the following properties:

Basic No. _____ 5.0
Percent sulphate ash _____ 25.7
Metal ratio _____ 4.35
Empirical formula, $QM_{4.35}(AO)_{0.18}(AI)_{3.17}$

EXAMPLE 40

4,590 grams of a 30% oil solution of barium petroleum sulphonate having a 7.8% sulphate ash, 363 grams of diisobutylphenol (ratio of equivalents is 1.7) and 2,800 grams of $H_2O$ were heated to 60° C. 1,042 grams of BaO were added slowly and then the temperature of the mixture was raised to 94–98° C. and held there for one hour. Thereafter the temperature was raised to 150° C. in four hours, and maintained there for one hour. A small portion of the mass, 361 grams, was removed and filtered to give product A, whereas the remainder (5,296 grams) was blown with $SO_2$ at 170° C. until 330 grams thereof was used. This latter mass was then filtered and the product given below as product B was obtained. The analyses of products A and B are as follows:

|  | Product A | Product B |
|---|---|---|
| Basic No. | 63 | 4.5 |
| Percent sulphate ash | 19.5 | 29.5 |
| Metal ratio | 3.18 | 5.35 |
| Empirical formulae | $QM_{3.18}(AO)_{0.59}(AI)_{1.59}$ | $QM_{5.35}(AO)_{0.17}(AI)_{4.18}$ |

From the foregoing examples it is shown that the method of treating the mass prior to filtering with an acidic material results in substantial increase in sulphate ash of the complex and thus correspondingly higher metal ratios.

The salt complexes can also be prepared by combining the oil-soluble metal sulphonate and inorganic metal compound in the presence of the sediment which forms occasionally in some of the methods illustrated above. The following examples illustrate the utility of the sediment for preparing salt complexes of the present invention.

EXAMPLE 41

1,700 grams of a 30% oil solution of barium petroleum sulphonate having a 7.6% sulphate ash were mixed with 61 grams of phenol (ratio of equivalents is 1.70) and the mixture was heated to 75° C. 261 grams of barium oxide and 710 grams of water were then added and the total mixture was raised in temperature to 100° C. and held at that level for one hour. Thereafter, the temperature was raised slowly to 150° C. and held there for about one hour. The total mixture was allowed to settle overnight, followed by decantation and filtering. In this experiment 450 grams of sediment were produced. The filtered salt complex was a viscous liquid, light brown in color, and contained a slight odor. The following properties of the product were determined:

Basic No. _____ 59.5
Percent sulphate ash _____ 21.2
Metal ratio _____ 3.20
Empirical formula, $QM_{3.20}(AO)_{0.59}(AI)_{1.61}$ The sediment obtained in Example 41 was employed in the preparation of a salt complex in the method given in the following Example 42.

EXAMPLE 42

1,700 grams of a 30% oil solution of barium petroleum sulphonate having a 7.6% sulphate ash, 20 grams of phenol, 450 grams of sediment obtained from the preparation given in Example 41, 710 grams of water and 261 grams of barium oxide (barium oxide added slowly) were mixed together and heated to a temperature of 100° C. for about one hour. The total mixture was then raised in temperature in a slow manner to about 150–160° C. and held there for one hour until substantially all the water was removed. The salt complex was separated by filtration and was found to be a viscous liquid, light brown in color, and contained a slight odor. The following properties were determined for the salt complex:

Basic No. _____ 82.6
Percent sulphate ash _____ 26.4
Metal ratio _____ 4.66
Empirical formula, $QM_{4.66}(AO)_{0.21}(AI)_{3.45}$ In the following examples, organic acids or salt thereof and inorganic alkaline earth metal compounds containing a metal other than barium were combined in the presence of a promoter to produce overbased products.

EXAMPLE 43

1,120 grams of a 45% oil solution of calcium petroleum sulphonate having a sulphate ash content of 6.5%, 59 grams of 1-nitro-propane (ratio of equivalents is 1.52), 150 grams of $Ca(OH)_2$ and 830 ml. of water were mixed together, and heated to about 100° C. for about one hour. The temperature was then raised to 150° C. and held at that level for one hour. The product was separated by filtering, and was found to be a viscous liquid, brown in color, and contained a faint odor. It was determined the end product had lost approximately 75% of the original nitro-propane by volatilization. The product possessed the following properties:

Basic No _____ 36.1
Percent sulphate ash _____ 13.15
Metal ratio _____ 2.36
Empirical formula, $QM_{2.36}(AO)_{0.18}(AI)_{1.18}$ The following example illustrates the use of a different promoter when employing the calcium metal in the components:

EXAMPLE 44

A mixture of 459 grams of phenol, 244 grams of water, and 90.5 grams of $Ca(OH)_2$ was stirred at the reflux temperature for two hours. Thereafter 1,046 grams of a 45% oil solution of calcium petroleum sulphonate having a 6.7% sulphate ash content were added (the ratio of sulfonate to phenol in the mass is 0.205). The mass was then heated to 125° C., at which temperature a distillate consisting of 244 grams of water and 32 grams of phenol was obtained. Thereafter the dehydrated mixture was blown with $CO_2$ for 3 hours at 120–150° C., and an additional 60 grams of distillate were collected, which distillate on analysis was found to contain 42 grams of phenol. On further heating to 200° C. under 20 mm. Hg absolute pressure, 375 grams more of phenol were recovered. The residue in the flask was then filtered to separate the desired salt complex, which was a brown, odorless fluid. The salt complex had the following analysis:

Basic No _____ 8.07
Percent sulphate ash _____ 18.35
Metal ratio _____ 3.07
Empirical formula, $QM_{3.07}(AO)_{0.16}(AI)_{1.91}$ Another preparation was made in which dissimilar alkaline earth metals were present in the organic acid compound and inorganic metal compound. The following example illustrates this feature of the invention.

EXAMPLE 45

1793 grams of a 45% oil solution of calcium petroleum sulphonate having a 6.45% sulfate ash, 206 grams of octyl phenol (ratio of equivalents is 1.7) and 954 grams of water were mixed together. Then 358 grams of BaO were added, and the mixture was agitated thoroughly. While insuring thorough mixing the temperature was raised to 90–100° C. for one hour. Thereafter, the temperature was raised to 150° C. over a two hour period and held at that level for one hour. The complex obtained by filtering the mixture had the following properties:

Basic No _____ 4.2
Percent sulphate ash _____ 25.2
Metal ratio _____ 3.94
Empirical formula, $QM_{3.94}(AO)_{0.59}(AI)_{2.35}$ The complexes of this invention can be also obtained by using a mixture of oil soluble organic acid and the alkaline earth metal salt thereof. The following example illustrates this concept.

EXAMPLE 46

2875 grams of petroleum sulphonic acid and 6000 grams of a 30% oil solution of barium petroleum sulphonate (sulfate ash is 7.6%) were admixed with 553.7 grams of para-tertiary-butyl phenol (ratio of equivalents is 1.60). The mixture was heated to about 50° C. whereupon a slurry of BaO (consisting of 2027.6 grams of BaO and 5395 grams of water) was added and the mixture was then maintained at a temperature of about 90–95° C. for an additional hour. Upon inspection, the mixture appeared thoroughly mixed, therefore the temperature was slowly raised to 150° C. and held there for approximately one hour. The product analyzed as follows:

Basic No _____ 73.0
Percent sulfate ash _____ 23.3
Metal ratio _____ 3.73
Empirical formula, $QM_{3.73}(AO)_{0.62}(AI)_{2.11}$

EXAMPLE 47

1239 grams of salt complex produced in Example 35 was heated to a temperature of 190° C. While maintaining this temperature for a period of 1½ hours, $CO_2$ was blown through the mixture. The temperature was then lowered to 150° C., continuing the passage of $CO_2$ through the mixture, and the basic number of the mixture was tested every 10 minutes, until the analysis showed a basic number of 2.5. The salt complex-$CO_2$ product was then separated and was found to be liquid in consistency, brown in color, and contained a very slight odor. The following properties were determined for the product:

Basic No _____ 2.5
Percent sulphate ash _____ 23.2

By comparison, the product of Example 35 contained a sulphate ash of 23.8% whereas the same product after blowing with $CO_2$ contained a sulphate ash of 23.2. Therefore, it can be seen that the metal ratio of the salt complex is substantially the same after treatment with $CO_2$. Empirical formula:

$$QM_{6.67}(AO)_{0.06}(AI)_{5.61}$$

EXAMPLE 48

6043 grams of the salt complex prepared in accordance with Example 6 were placed in a suitable vessel and $CO_2$ gas was injected at the bottom of the vessel at a rate of 3750 cc. per minute for a period of 1⅙ hours. During this period, the temperature was in the range of 30–70° C. At the end of the blowing operation the product weighed 6346 grams, showing a gain in weight of 311 grams. The product was fluid, dark red in color, and contained no odor. The following properties were determined for the salt complex-$CO_2$ product:

Basic No _____ 4.3
Percent sulphate ash _____ 22.7

It can be seen, therefore, by the gain in weight of the product that the $CO_2$ actually enters into combination with the salt complex. Furthermore, the metal ratio of the product is substantially the same as the salt complex prior to being blown with $CO_2$, since the sulphate ash content is substantially the same as before $CO_2$ treatment, and conformed to the empirical formula:

$$QM_{3.59}(AO)_{0.14}(AI)_{2.45}$$

Another salt complex product which was blown with $CO_2$ is given in Example 49 below.

EXAMPLE 49

2500 grams of a 30% oil solution of barium petroleum sulphonate containing 7.6% sulphate ash were mixed with 45.6 grams of phenol (ratio of equivalents is 3.36) and heated to 95° C. A slurry of barium oxide containing 422 grams of barium oxide and 1125 ml. of water was added to the mixture, with stirring, and held at a temperature of 97–102° C. for a period of one hour. The temperature was then slowly raised over a period of three hours to 150° C. and maintained at that level for an additional period of one hour until substantially all the water was removed. The desired salt complex was separated by filtering and was found to be an oily liquid, brown in color, and contained a faint odor. The following properties were determined:

Basic No _____ 60.6
Percent sulphate ash _____ 22.3
Metal ratio _____ 3.34
Empirical formula, $QM_{3.34}(AO)_{0.30}(AI)_{2.04}$

EXAMPLE 50

1250 grams of the salt complex produced in accordance with the method given in Example 49 above were blown with $CO_2$ for approximately two hours at a temperature below 60° C., until an acid number of 5.0 was obtained. The weight of product obtained was 1260 grams.

The $CO_2$-salt complex product was then heated at a temperature of 190° C. under a vacuum of 10 mm. producing a distillate weighing about 10 grams. The distillate was then dissolved in iso-propyl ether and then dried over magnesium sulphate, filtered and then the magnesium sulphate was removed by filtration. 5 grams of residue remained. This residue was found to be phenol, thus indicating that treatment of the salt complex with an acidic material liberates at least a portion of the ionizable organic compound from complex formation.

After the distillation step, the following properties for the salt complex were determined:

Basic No _____ 2.96
Percent sulphate ash _____ 22.4

The percent sulphate ash of the $CO_2$-salt complex product indicates that little or no metal is removed from the complex as a result of the $CO_2$ treatment and the distillation step to recover the ionizable organic compound. The product conformed to the empirical formula:

$$QM_{3.34}(AO)_{0.09}(AI)_{2.25}$$

EXAMPLE 51

1440 grams of the salt complex obtained by the method given in Example 40 was blown with $CO_2$ for about two hours at a temperature of 30–60° C. until the product showed an acid number of 6. The product thus obtained was then heated at a temperature of 200° C. under vacuum of 4 mm. to recover approximately 15 grams of phenol. The residue of the distillation was a viscous liquid, light brown in color, and contained a slight odor. This product possessed the following properties:

Basic No _____ 1.06
Percent sulphate ash _____ 22.6
Metal ratio _____ 3.20
Empirical formula, $QM_{3.20}(AO)_{0.03}(AI)_{2.17}$ Here again it is shown that the treatment of the salt complex with an acidic material liberates the promoter from complex formation.

EXAMPLE 52

6000 grams of a 30% solution of barium petroleum sulphonate (sulphate ash 7.6%), 348 grams of para-tertiary-butyl phenol (ratio of equivalents is 1.70), and 2915 grams of water were mixed and heated to a temperature of 60° C. 1100 grams of barium oxide were added slowly and the temperature of the total mixture was raised to 94–98° C. and held there for one hour. The temperature of the mixture was then slowly raised over a period of 7½ hours to about 150° C. and held at that level for an additional hour until substantially all the water was removed. The salt complex obtained is a liquid, brown in color, and did not contain any odor. The following properties were determined:

Basic No _____ 82.5
Percent sulphate ash _____ 26.0
Metal ratio _____ 4.2
Empirical formula, $QM_{4.2}(AO)_{0.59}(AI)_{2.61}$ An experiment was conducted in order to determine whether air which contains $CO_2$ would be effective as an acidic material. The examples below illustrate the utility of air for this purpose.

EXAMPLE 53

380 lbs. of a 30% oil solution of barium petroleum sulphonate were mixed with 21.9 lbs. of para-tertiary-butyl phenol (ratio of equivalents is 1.7) and 184 lbs. of water. This mixture was heated to 50° C. and 68 lbs. of BaO were added over a period of 1½ hours while not permitting the temperature to go above 65° C. The total mixture was held at 100° C. for one hour, then heated to 150° C. over a period of 4.8 hours and held there for one hour. The desired product was fluid, dark red, and possessed the following properties:

Basic No _____ 80.5
Percent sulphate ash _____ 26.0
Metal ratio _____ 4.2
Empirical formula, $QM_{4.2}(AO)_{0.59}(AI)_{2.61}$

EXAMPLE 54

6000 grams of the product produced in Example 53 were placed in a 12-liter, 3-necked flask and heated to 175° C. The mass was then blown with air until a basic number of 1 was obtained. The final product contained a sulphate ash of 26.4% indicating substantially no change in the amount of metal present. The product had the empirical formula:

$$QM_{4.2}(AO)_{0.03}(AI)_{3.17}$$

In all of the foregoing examples, the ratio of equivalents of the organic acid or salt thereof to the promoter has been within the preferred range, viz. 1.5–3.5– to 1. The following examples illustrate the preparation of end-products wherein the ratio of equivalents falls outside of said preferred range, but comes within the broad range found to be operable.

EXAMPLE 55

1000 grams of a 30% oil solution of barium petroleum sulphonate containing 7.6% sulphate ash were mixed with 750 grams of water at 50° C. 282 grams of BaO were added thereto, followed by the addition of a slurry consisting of 460 grams of water, 87 grams of BaO, and 115 grams of para-tertiary-butyl phenol (ratio of equivalents of sulphonate to phenolic compound is 0.77). The mass was stirred for one-half hour at about 100° C., then it was heated to 200° C. and maintained at that temperature for 2 hours.

The salt complex was separated by filtration. It was a red-brown, viscous liquid, and had the following properties:

Basic No _____ 46
Percent sulphate ash _____ 27.9
Metal ratio _____ 5.4
Empirical formula, $QM_{5.4}(AO)_{1.3}(AI)_{3.1}$

EXAMPLE 56

2760 grams of a 30% oil solution of barium petroleum sulphonate containing 7.6% sulphate ash were mixed with 217 grams of BaO, 580 grams of water and 41 grams of diisobutenyl sulphonic acid in that order. The ratio of equivalents is sulphonate to sulphonic acid is 9.

The mass was heated for one hour at about 100° C., then the temperature was raised to 150° C. and maintained there for one hour. The salt complex was separated by filtration. It was a viscous, brown liquid, and had the following properties:

Basic No _____ 34
Percent sulphate ash _____ 17.3
Metal ratio _____ 2.4
Empirical formula, $QM_{2.4}(AO)_{0.11}(AI)_{1.29}$

EXAMPLE 57

1000 grams of petroleum sulphonic acid, 98.1 grams of para-tertiary-butyl phenol (ratio of equivalents of sulphonic acid to phenolic compound is 1.7) and 989 grams of water were mixed together and heated to 50° C. Thereafter 258 grams of strontium oxide (SrO) were added to the mixture and the temperature was raised to 100° C. and maintained at that level for about one hour. Then the temperature was raised to about 150° C. and held there for an additional hour. Thereafter $CO_2$ was introduced into the mixture for ½ hour at a rate of 2 cubic ft. per hr. and the salt complex separated by filtration. The salt complex was a liquid of a brownish color and had the following analyses:

Basic No _____ 1.87
Percent sulphate ash _____ 13.7
Metal ratio _____ 1.65
Empirical formula, $QM_{1.65}(AO)_{0.017}(AI)_{0.60}$

EXAMPLE 58

1530 grams of a 30% oil solution of barium petroleum sulphonate having a 7.6% sulphate ash and 210 grams of trichlorodiphenyl ether sulphonic acid (ratio of equivalents is 1.7) were heated to 70° C. To this mixture were added 725 grams of water followed by the addition of 271 grams of BaO. The entire mixture was refluxed for one hour, then heated to 150° C. over a three hour period and held there for one hour. Prior to filtering, the mixture was blown with $CO_2$ at 150° C. and at a rate of 3.6 cu. ft./hr. for one and one-half hours. The filtered product analyzed as follows:

Acid No _____ 0.45
Percent sulphate ash_____ 24.7
Metal ratio_____ 4.34
Empirical formula, $QM_{4.34}(AO)_{0.59}(AI)_{2.75}$ It should be noted that in all of the specific examples given above, the mahogany sulphonates were referred to as either calcium, barium or strontium petroleum sulphonate, and likewise a similar designation was used for the mahogany acid.

The alkaline earth metal complexes of the invention heretofore described can serve as starting materials for the production of metal complexes of even higher metal content, which shall be termed for convenience as "superbased salts" or "superbased complexes."

In this particular aspect of our invention, the complex produced in accordance with the techniques previously set forth is first treated with an inorganic acidic reagent which when present in the reaction mass has an ionization constant higher than that of the organic compound whose union is present in the organic aquasalt. Acidic reagents useful for this purpose include, for example, the strong mineral acids as well as various acid anhydrides and acid halides. The examples of suitable acidic reagents, effective in the presence of either free or combined water, include HCl, $H_2SO_4$, $HNO_3$, $CO_2$, COS, $SO_2$, $SO_3$, air (because of $CO_2$ content), $NO_2$, $H_2S$, $H_2Se$, $N_2O_3$, $PCl_3$, $SOCl_2$, $SO_2Cl_2$, $ClO_2$, $BF_3$, $H_2F_2$, $CS_2$, and the like.

The choice of the particular acidic reagent to be used in connection with the superbasing technique is influenced by the type or organic aquasalt present in the initial metal salt complex starting material. When the organic aquasalt has been formed of a weakly acidic compound such as phenolic and enolic compounds, relatively more acidic reagents such as $CO_2$ or COS will possess a high enough ionization constant in the reaction mass to liberate at least a portion of the anion of such compounds from their aquasalts. On the other hand, when the organic aquasalt is formed from a relatively strong acid, e. g. a carboxylic acid, the acidic reagent selected must be one which will have a higher ionization constant, i. e. a stronger acidic reaction, so as to perform the function of liberating at least a portion of the anion of such stronger acid from its aquasalt prior to the superbasing step described below.

After the "acid-treated" salt complex has been prepared, the next step in our superbasing technique is to add a proportion of inorganic alkaline earth metal compound, preferably from 3 to 40% by weight, and optionally water and additional amount of an organic aquasalt or the free salt-forming compound from which such aquasalt is formed. Thereafter the mass is heated to a temperature not substantially in excess of 350° C., preferably from about 110° C. to 200° C., to effect the complexing of the inorganic alkaline earth compound and thereby yield the desired superbased salt.

The superbased salt may be used as such or may be treated with an additional amount of acidic reagent to reduce its titratable basicity. As a further refinement, the latter acid-treated material may be complexed with additional inorganic alkaline earth metal compound to further increase its metal content. For most purposes, however, the superbased salt initially produced will be found to be satisfactory.

The following examples illustrate the preparation of superbased salts in accordance with the general principles which have been set forth.

EXAMPLE 59

(a) 6000 grams of a 30% solution of barium petroleum sulphonate (sulfate ash 7.6%), 348 grams of para-tertiary butyl phenol (ratio of equivalents is 1.53), and 2911 grams of water were mixed and heated to a temperature of 60° C. 1100 grams of barium oxide were added slowly and the temperature of the total mixture was raised to 94–98° C. and held there for one hour. The temperature of the mixture was then slowly raised over a period of 7½ hours to about 150° C. and held at that level for an additional hour, until substantially all the water was removed. The metal complex obtained is a liquid, brown in color, and did not contain any odor. The following properties were determined:

Basic No_____ 82.5
Percent sulphate ash_____ 26.0
Metal ratio_____ 4.35

(b) 6623 grams of the metal complex produced in accordance with (a) above were treated with $SO_2$ until 327 grams of the gas were combined with the metal complex. The product thus obtained had a neutralization number of 0. The $SO_2$-metal complex product was liquid, brown in color, and did not contain any odor.

(c) 1000 grams of the $SO_2$-treated metal complex produced in accordance with (b) above were mixed with 286 grams of water and heated to a temperature of 60° C. Thereafter 107.5 grams of barium oxide were added slowly and the temperature was then maintained at 94–98° C. for one hour. Following this step, the total mixture was raised in temperature to 150° C. over a period of 1⅙ hours and held there for a period of one hour. The superbased salt was purified by filtration, and was found to be a liquid, brown in color, and did not contain any odor. The following properties of the superbased salt were determined:

Basic No_____ 38.6
Percent sulfate ash_____ 33.7
Metal ratio_____ 6.30
Empirical formula, $QM_{6.3}(AO)_{0.65}(AI)_{4.65}$ It can be seen from (a) above that the sulphate ash of the product increased from 26.0 to 33.7. Furthermore, the product produced in (b) above involved the treatment of complex with $SO_2$ to obtain a zero basic number; whereas in (c) above, the basic number was increased to 38.6. It is clearly shown, therefore, that by additionally treating with $SO_2$-metal complex product with an inorganic metal compound, the resultant product contains additional metal over and above that which is found in the complex prior to treatment with the organic metal compound.

In the next example, it will be shown that water is not required in the superbasing step, in order to obtain superbased salts which contain substantially more metal than the organic salt complex starting material.

EXAMPLE 60

(a) 6000 grams of 30% oil solution of barium petroleum sulphonate (sulfate ash 7.6%), 348 grams of para-tertiary-butyl phenol (ratio of equivalents is 1.53), and 2911 grams of water were mixed and heated to a temperature of 60° C. To this mixture were slowly added 100 grams of barium oxide and the temperature was then raised to 94–98° C. and held there for a period of one hour. The total mixture is raised in temperature to 150° C. over a period of 7½ hours and held there for a period of one hour. The metal complex is separated by filtering the product. The complex was found to be a liquid, brown in color, and did not contain any odor. The following properties were determined for the product.

Basic No_____ 72.8
Per cent sulfate ash_____ 22.3
Metal ratio_____ 3.69

(b) 6190 grams of the metal complex obtained in accordance with the method given in (a) above were treated with $CO_2$ for a period of 1½ hours, at a temperature of 26–55° C. The total gain in weight of the complex by virtue of the $CO_2$ treatment was 179 grams. The final product had a basic number of 1.5.

(c) 1029 grams of the $CO_2$-metal complex of (b) above were heated to 50° C. and then 109.8 grams of anhydrous barium hydroxide were added. The total mixture was held at a temperature of 100° C. for one hour and the temperature was raised to 150° C. and held at that level for a period of one hour. The desired superbased salt was separated by filtering and was found to be fluid in consistency, and reddish brown in color. The following properties were determined.

Basic No_____ 31.5
Per cent sulfate ash_____ 28.6
Metal ratio_____ 5.10
Empirical formula, $QM_{5.1}(AO)_{0.65}(AI)_{3.45}$ By comparing the product formed in (c) above with the product of (a) above, it can be seen from the sulfate ash analyses that an appreciable amount of metal has been incorporated in the ultimate product.

EXAMPLE 61

(a) 400 lbs. of a 30% oil solution of barium petroleum sulphonate (sulfate ash 7.6%) were placed in a suitable vessel and heated to 26° C. At this temperature 32.5 lbs. of diisobutylphenol were added, and the mixture was mixed thoroughly. Then 197 lbs. of water were added, followed by an addition of 73 lbs. of BaO over a 30 minute period, while keeping the temperature at 57–84° C. Thereafter the temperature was raised to 100° C. and kept there for 1 hour, followed by another temperature increase to 152° C. and maintained at the latter level also for 1 hour. The process mixture was then blown with 75 lbs. of $CO_2$ over a three hour period and at a temperature of 135–170° C. The separated product had the following properties:

Basic No_____ 5.0
Per cent sulfate ash_____ 25.7
Metal ratio_____ 4.35

(b) 1000 grams of the product produced above in (a) and 121.8 grams of diisobutyl-phenol were placed in a suitable container and mixed thoroughly at 50° C. Then 234 grams of $Ba(OH)_2$ were added, followed by raising the temperature of the mass to 100° C. and holding for 1 hour. The temperature of the mixture was again raised to 150° C. and maintained at that level for 1 hour. A portion of the process mass was filtered and the separated product analyzed as follows:

Basic No_____ 42.8
Per cent sulfate ash_____ 33.7
Metal ratio_____ 6.3
Empirical formula, $QM_{6.3}(AO)_{1.68}(AI)_{3.62}$ The remainder of the unfiltered process mass was blown with $CO_2$ at a rate of 3 cubic feet per hour for 1 hour at 150° C. The process mass was then filtered and the desired superbased salt had the following properties.

Basic No_____ 7.6
Per cent sulfate ash_____ 39.8
Metal ratio_____ 9.3
Empirical formula, $QM_{9.3}(AO)_{.37}(AI)_{7.93}$ The above data clearly demonstrates the beneficial use of a promoter in preparing a superbased salt. Furthermore, it should be noted that upon treating the process mass, prior to filtering, with an acidic material, the metal content is substantially increased as is evident from the sulfate ash analyses in the above example.

Another experiment was conducted in which a different promoter was utilized in the superbasing step.

EXAMPLE 62

(a) 380 pounds of a 30% oil solution barium petroleum sulphonate having a 7.6% sulfate ash, 21.9 pounds of para-tertiary butyl phenol and 184 pounds of water were mixed in a suitable vessel, and then heated to 124° F. 68 pounds of BaO were added to the mixture over a 1½ hour period while the temperature was maintained at 124–184° F. The temperature of the total mixture was raised to 211° F. in one hour and maintained at that level for an additional hour. Thereafter, the temperature was again raised to 308° F. over a 4.8 hour period and held at that level for 1 hour. Hyflo, a filter aid, was added and the material was filtered while still hot. The separated product had the following properties.

Basic No_____ 80.5
Per cent sulfate ash_____ 26.0
Metal ratio_____ 4.2

(b) 355 pounds of the metal complex of (a) above were heated to about 110° F. Then 14.5 pounds of gaseous $CO_2$ were passed through the metal complex over a 5½ hour period, while maintaining the temperature at about 110–165° F. The treated metal complex was cooled and the following analyses were determined.

Acid No_____ 2.4
Per cent sulfate ash_____ 25.1
Metal ratio_____ 4.2

3000 grams of the above $CO_2$ treated metal complex and 210 grams of para-tertiary butyl phenol were mixed together and heated to 100° C. 618 grams of BaO were added to the mixture, and then the temperature was held at 100° C. for 1 hour. Thereafter the temperature of the total mixture was raised to 150° C. in 70 minutes and held at that level for 3 hours. 666 grams of the process mass were filtered, and the separated product analyzed as follows:

Basic No_____ 86.0
Per cent sulfate ash_____ 39.1
Metal ratio_____ 8.0
Empirical $QM_{8.0}(AO)_{1.96}(AI)_{5.04}$ The remainder of the process mass, 3016 grams was blown with $CO_2$ for 25 minutes at 150° C. A 52 gram increase in weight of process mass was noted as a result of $CO_2$ treatment. The mass was filtered and the separated product analyzed as follows:

| | |
|---|---|
| Basic No. | 10.25 |
| Per cent sulfate ash | 40.9 |
| Metal ratio | 8.35 |
| Empirical formula, $QM_{8.35}(AO)_{0.44}(AI)_{6.91}$ | |

*Acids useful in preparation of oilsalts*

Since the meaning of the term soap is restricted to salts of carboxylic acids, we utilize the term oilsalt as meaning the oil-soluble alkaline earth metal salts of organic acids. The term oilsalts excludes oil-insoluble salts.

In preparing the organic metal complexes of this invention, the oilsalts or their acid derivatives are used as starting materials. The term "starting material" as used herein and in our co-pending applications above identified, is defined as oilsalts and their acid derivatives. Thus, barium petroleum sulfonate is an oilsalt, petroleum sulfonic acid is a derivative of this oilsalt, and either one or both can be used as a starting material. At this point it should be noted that whereas earlier workers found it necessary to first prepare a normal oilsalt and then react the oilsalt with an additional amount of a salt-forming material, the process of this invention can be carried on as a one-step process by beginning with the oil-soluble organic acid. While it is possible to first prepare an oilsalt of the organic acid in the usual way, by a conventional salt-forming procedure, and then begin the process by utilizing such oilsalt as one of the starting materials, it may be more convenient to employ as the starting material the organic acid rather than the oilsalt. The process is operable for the production of certain types of compounds when utilizing as starting materials any of the complexes produced by the prior art processes. Also, as a starting material, mixtures of acids and oilsalts can be used to produce the complex. Oilsalts can be prepared from organic acids containing at least 12 aliphatic carbon atoms and selected from the class consisting of aliphatic and cyclic; sulphur acids, carboxylic acids, phosphorus acids, the thio acids of any of the foregoing acids.

More specific examples of organic acids useful in preparation of oilsalts are the sulphur acids including sulphonic, sulphamic, sulphinic, thiosulphonic, etc., and of these the sulphonic acids will find particular application under the present invention. A more specific identification of the sulphonic acids is given hereinbelow.

The carboxylic acids useful in preparation of oilsalts include the fatty acids wherein there are present at least about 12 and preferably 15 carbon atoms, such as, for example, palmitic, stearic, myristic, oleic, linoleic, etc. acids. The carboxylic acids of the aliphatic type can contain elements in the aliphatic radical other than carbon and hydrogen; examples of such acids are the carbamic acids, ricinoleic acids, chloro-stearic acids, nitro-lauric acids, etc. In addition to the aliphatic carboxylic acids, it is intended to employ the cyclic types such as those containing a benzenoid structure, i. e., benzene, naphthalene, etc., and an oil-solubilizing radical or radicals having a total of at least about 15 to 18 carbon atoms. Such acids are the oil-soluble aliphatic substituted aromatic acids as for example, stearyl-benzoic acids, mono- or polywax substituted benzoic or naphthoic acids wherein the wax group contains at least about 18 carbon atoms, cetyl hydroxy-benzoic acids, etc. The cyclic type of carboxylic acids also includes those acids which have present in the compound a cycloaliphatic group. Examples of such acids are petroleum naphthenic acids, cetyl cyclohexane carboxylic acids, di-lauryl deca-hydronaphthalene carboxylic acids, di-octyl cyclopentane carboxylic acids, etc. It is also contemplated to employ the thio-carboxylic acids, that is, those carboxylic acids in which one or both of the oxygen atoms of the carboxylic group are replaced by sulphur. These carboxylic and thio-carboxylic acids can be represented by the following formulae:

I   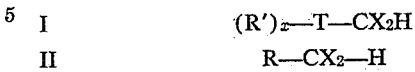

II   $R—CX_2—H$ wherein R' is an aliphatic radical, $x$ is at least 1, and $(R')_x$ contains a total of at least about 15 to 18 carbon atoms; T is a cyclic nucleus such as benzene, naphthalene, diphenyl ether, diphenylene oxide, diphenyl sulphide, diphenylene sulphide, phenol, hydroxy-naphthalenes, phenol disulphides, petroleum naphthenes, cyclohexane, cyclopentane, chloro-cyclohexane, nitro-cyclopentane, deca-hydronaphthalene, mercapto-deca-hydro-naphthalene, etc.; and X is either oxygen or sulphur. In Formula II, R is an aliphatic group containing at least 12 carbon atoms and X is either oxygen or sulphur. R, R', and T can also contain other substituent groups such as nitro, amino, hydroxy, mercapto, halogen etc. Representative examples are nitro-stearic acids, ceryl-chloro salicylic acids, chloro-palmitic acids, cetyl-anthranilic acids, stearyl-mercapto-naphthoic acids, etc.

The phosphorus acids useful in preparation of oilsalts include tri- and pentavalent organic phosphorus acids and the corresponding thio-acids, which are, for example, phosphorus, phosphoric, thiophosphoric, thiophosphorous, phosphinic, phosphonic, thiophosphinic, thiophosphonic, etc. acids. Among the most useful of the phosphorus acids are those represented by the following formulae:

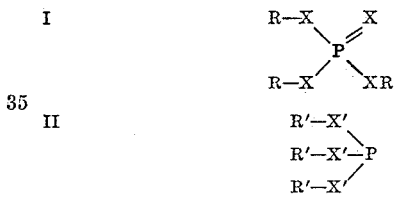

wherein X and X' are either oxygen or sulphur and at least one X and one X' is sulphur, and R and R' are each either the same or different organic radicals or hydrogen, and wherein at least one is an organic radical and at least one R is hydrogen and wherein at least one R' is an organic radical and at least one R is hydrogen. Therefore, such formulae include the oil-soluble organic thio-acids of phosphorus, more particularly the organic thio-phosphoric acids and the organic thiophosphorous acids. The organic radicals R and R' can be aliphatic, cyclo-aliphatic, aromatic, aliphatic- and cycloaliphatic-substituted aromatic, etc. The organic radicals R and R' preferably contain a total of at least about 12 carbon atoms in each of the above thio-acid types I and II. Examples of such acids are dicapryl dithiophosphoric acids, di-(methyl-cyclohexyl) dithiophosphorous acids, di-(methyl-cyclohexyl) dithiophosphorous acids, lauryl monothio-phosphoric acids, di-(butyl-phenyl) dithiophosphoric acids, and mixtures of two or more of the foregoing acids.

Certain of the above described thio-acids of phosphorus such as for example di-capryl dithiophosphoric acid are also commonly referred to as acid esters.

As indicated, our process is applicable not only when using the oil-soluble organic acid as such as one of the starting materials, but also oilsalts or the alkaline earth metal salts of such organic acids. The present process will produce a high metal content organo metallic material when as one of the starting materials one uses any of the metal organic complexes produced by the prior art workers, such as for example, Griesinger, Campbell et al., McLennan and Mertes. We thus may utilize as a starting material the end product produced by these prior art workers and from them produce the novel high metal content complex of our invention.

From the broad class of available organic acid compounds, it is preferred to employ the oil-soluble sulphonic acid compounds. Furthermore, of the available alkaline earth metal salts of organic acids, the barium salts thereof are preferred for the reasons that unexpectedly excellent results are obtained by the use thereof. These oil-soluble sulphonic acids, and the alkaline earth metal salts thereof can be represented by the following structural formulae:

I          $[R_x—T—(SO_3)_y]_z M_b$
II          $[R'—(SO_3)_a]_d M_c$

In the above formulae M is either an alkaline earth metal, preferably barium, or hydrogen; T is a cyclic nucleus either of the mono- or poly-nuclear type including benzenoid or heterocyclic nuclei such as benzene, naphthalene, anthracene, phenanthrene, diphenylene, thianthrene, phenothioxine, diphenylene sulphide, diphenylene oxide, diphenyl oxide, diphenyl sulphide, diphenyl amine, etc.; R is an aliphatic group such as alkyl, alkenyl, alkoxy, alkoxy-alkyl, carboalkoxy-alkyl, or aralkyl groups, $x$ is at least 1, and $R_x$ contains a total of at least about 15 to 18 carbon atoms; R' in Formula III is an aliphatic radical containing a total of at least about 15 to 18 carbon atoms, and M is either an alkaline earth metal, preferably barium, or hydrogen. When R' is an aliphatic substituted cycloaliphatic group, the aliphatic substituent should contain a total of at least about 12 carbon atoms. Examples of types of the R' radical are alkyl, alkenyl, and alkoxy-alkyl radicals, and aliphatic substituted cycloaliphatic radicals where the aliphatic group is alkyl, alkoxy, alkoxy-alkyl, carboalkoxyalkyl, etc. Specific examples of R' are cetyl-cyclohexyl, lauryl-cyclohexyl, ceryloxyethyl, and octadecenyl radicals, and radicals derived from petrolatum saturated and unsaturated paraffin wax, poly olefins, including poly-$C_3$, $C_4$, $C_5$, $C_6$, $C_7$, $C_8$, olefin hydrocarbons. The groups T, R, and R' in the above formulae can also contain other organic or inorganic substituents in addition to those enumerated above, such as for example, hydroxy, mercapto, halogen, nitro, amino, nitroso, carboxy, ester, etc.

In Formula I above, $x$, $y$, $z$ and $b$ are at least one; whereas in Formula II, $a$, $d$, and $c$ are at least one.

The following are specific examples of oil-soluble sulphonic acids coming within Formulae I and II above, and it is to be understood that such examples serve to also illustrate the alkaline earth metal salts of the sulphonic acids. In other words, for every sulphonic acid, it is intended that the alkaline earth metal salt thereof is also illustrated. This includes specifically, the barium, strontium, and calcium salts of the hereinbelow illustrated sulphonic acids.

Such sulphonic acids are mahogany sulphonic acids; petrolatum sulphonic acids; mono- and polywax substituted naphthalene sulphonic, phenol sulphonic, diphenyl ether sulphonic, diphenyl ether disulphonic, naphthalene disulphide, sulphonic, naphthalene disulphide disulphonic, diphenyl amine disulphonic, diphenyl amine sulphonic, thiophene sulphonic, alpha-chloro-naphthalene sulphonic acids, etc.; other substituted sulphonic acids such as cetyl chlorobenzene sulphonic acids, cetyl-phenol sulphonic acids, cetyl-phenol disulphide sulphonic acids, cetyl-phenol mono-sulphide sulphonic acids, cetoxy capryl-benzene sulphonic acids, di-cetyl thianthrene sulphonic acids, di-lauryl beta-naphthol sulphonic acids, and di-capryl nitro-naphthalene sulphonic acids; aliphatic sulphonic acids such as paraffin wax sulphonic acids, unsaturated paraffin wax sulphonic acids, hydroxy substituted paraffin wax sulphonic acids, tetraisobutylene sulphonic acids, tetra-amylene sulphonic acids, chloro-substituted paraffin wax sulphonic acids, nitroso paraffin wax sulphinic acids, etc.; cycloaliphatic sulphonic acids, such as petroleum naphthene sulphonic acids, bis-(diisobutyl)-cyclohexyl sulphonic acids, mono- and poly-wax substituted cyclohexyl sulphonic acids, etc.

With respect to the sulphonic acids, it is intended herein to employ the term "petroleum sulphonic acids" to cover all sulphonic acids which are derived from petroleum products. Additional examples of sulphonic acids and/or alkaline earth metal salts thereof which can be employed as starting materials are disclosed in the following U. S. Patents: 2,174,110; 2,174,506; 2,174,508; 2,193,824; 2,197,800; 2,202,791; 2,212,786; 2,213,360; 2,338,598; 2,233,676; 2,239,974; 2,263,312; 2,276,090; 2,276,097; 2,315,514; 2,319,121; 2,321,022; 2,333,568; 2,333,788; 2,335,259; 2,337,552; 2,346,568; 2,366,027; 2,374,193 and 2,383,319.

Of the various types of organic acids and oilsalts thereof enumerated above, i. e. sulphur acids, carboxylic acids, phosphorus acids, etc., it is preferred to employ the sulphur-bearing organic acids or oilsalts thereof. However, it is to be understood that all of organic acids and oilsalts thereof are not equivalent in their ability to complex with unusual amount of inorganic alkaline earth metal compounds in the presence of aquasalts, because under certain conditions, some organic acids or salts thereof are more effective than others.

*Materials useful in preparation of organic aquasalts*

Aquasalts, as previously defined, are oil-insoluble salts. The organic aquasalts and their acid derivatives are effective as promoters and may be so designated, since their function is to promote the formation of the organic metal complexes.

The promoter employed in the process of this invention can be the organic compound (AO)H wherein H is hydrogen or the metal equivalent thereof and (AO) the hydrogen equivalent of the anion of an aquasalt. Also the aquasalt of (AO)H can be used alone or in admixture with the compound (AO)H. The compounds (AO)H should have ionization constants measured in water at 25° C. greater than about $1 \times 10^{-10}$, water solubilities of at least about 0.0005% at 50° C. and saturated aqueous solutions of which at about 25° C. exhibit a pH less than seven.

Generally, the organic aquasalts include the alkaline earth metal salts of a variety of classes of compounds such as, for example, phenolic compounds, enolizable organic compounds, lower molecular weight aromatic carboxylic acids, lower molecular weight organic thiophosphoric acids, the lower molecular weight sulphonic acids, hydroxy aromatic compounds, lower molecular weight hydroxy aromatic acids, etc. To better illustrate the wide variety of classes of compounds which can be employed in forming the metal complexes in accordance with the present invention, specific examples are enumerated below. It is to be understood that while only the ionizable organic compounds are illustrated, it is intended that the alkaline earth metal salts thereof or the aquasalts are included as specific examples. More particularly, the calcium, barium, and strontium salts of such illustrated ionizable organic compounds are intended.

The term phenolic compound as used in this specification and the appended claims is intended to include all organic compounds having at least one hydroxyl group attached directly to a benzenoid carbon atom which may be part of a single or fused ring, and which compound may or may not have other substituents on the benzenoid nucleus. It should likewise be understood that "a phenol" is a sub-class of a phenolic compound, in which there is only a hydroxyl group on the benzene ring or in addition to the hydroxyl group, there is also present in the molecule a single hydrocarbon group or a plurality thereof. Those phenolic compounds containing not more than 30 carbon atoms in the molecule are preferred.

Throughout this specification and in the claims, whenever we use the term enolizable organic compounds we means those salt-forming compounds which in the salt-forming state contain a hydroxyl radical linked to an acid-forming element which is either a non-heterocyclic nitrogen atom or a non-benzenoid carbon atom, such acid-forming element being bonded to an adjacent carbon atom, said salt-forming compounds being capable of existing in a tautomeric form wherein the hydroxyl radical referred to above may revert to a doubly bonded oxygen atom, i. e., wherein the oxygen atom of said hydroxyl radical may be bonded either as

or

wherein X is nitrogen or a non-benzenoid carbon.

The ionizable organic compounds found useful for preparation of organic aquasalts are phenol; alkylated phenols such as, for example, cresols, xylenols, p-ethyl phenol, di-ethyl phenols, n-propyl-phenols, di-isopropyl-phenols, p-t-butyl-phenol, p-t-amyl-phenyl, p-cyclo-pentyl-phenol, p-(4-methyl-cyclohexyl)-phenol, sec-hexyl-phenol, n-heptyl-phenol, diisobutyl-phenols, 3,5,5-tri-methyl-n-hexyl-phenol, and other low molecular weight phenols whose alkaline earth metal salts are oil-insoluble; aryl substituted phenols, e. g. phenyl phenol, diphenyl phenol, etc.; poly-hydroxy aromatic compounds such as alizarin, quinizarin or polyhydroxy-benzenes, e. g., hydroquinone, catechol, pyrogallol, etc.; mono-hydroxy naphthalenes, e. g., alpha-naphthol, beta-naphthol, etc.; polyhydroxy naphthalenes, e. g. naphthohydroquinone, naphthoresorcinol, etc.; the alkylated polyhydroxyaromatic compounds such as octyl-catechols, triisobutylpyrogallols, etc.; substituted phenols such as p-nitro-phenol, picric acid, o-chlorophenol, t-butyl-chlorophenols, p-nitro-o-chlorophenol, p-amino-phenol, etc.; lower molecular weight hydroxy aromatic carboxylic acids such as salicylic acid, chloro-salicylic acids, di-isopropyl-salicylic acids, gallic acid, 4-hydroxyl-1-naphthoic acid, etc.; lower molecular weight aromatic sulphonic acids such as p-cresol sulphonic acids, p-t-butyl-phenol sulphonic acids, beta-naphthol alpha-sulphonic acid, etc.; lower molecular weight aromatic carboxylic acids such as benzoic acid, p-nitro-benzoic acid, o-chlorobenzoic acid, p-toluic acid, p-t-butyl-benzoic acid, alpha-naphthoic acid, etc.; lower molecular weight aromatic sulphonic acids such as benzene sulphonic acid, p-chlorobenzene sulphonic acid, p-nitrobenzene sulphonic acid, p-tolyl sulphonic acid, p-t-butyl-benzene sulphonic acid, t-amyl-naphthalene sulphonic acids, etc.; lower molecular weight aliphatic sulphonic acids such as ethyl sulphonic acid, beta-chloro-ethyl sulphonic acid, gamma-nitro-propyl sulphonic acid, octyl sulphonic acids, chloro-diisobutyl sulphonic acids, diisobutenyl sulphonic acids, etc.; nitro-paraffins such as 1-nitro propane, 2-nitro-n-butane, 1-nitro-1-(p-diisobutyl-phenoxy) propane, etc.; and other enolizable compounds such as, for example, oximes, e. g., isophorone oxime, benzal acetone oxime; imines, e. g., 4-keto-2-pentylidene imine; amides, e. g., N-butyl-benzamide, o-chloro-benzamide, acetamide, acet-anilide, keto-esters, e. g., ethyl acetoacetate, phenyl aceto-acetate; poly-ketones, e. g., acetyl acetone, benzoyl acetone; poly-esters, e. g., diethyl malonate, di-benzyl malonate; imides, etc.; lower molecular weight acids of phosphorus including aliphatic dithiophosphoric acids, e. g., di-isopropyl dithiophosphoric acid, di-n-butyl dithiophosphoric acids, etc., aromatic dithiophosphoric acids, e. g., di-(phenyl) dithiophosphoric acids, etc., the aliphatic mono thiophosphoric acids, e. g., di-ethyl mono-thiophosphoric acids, etc., the aromatic mono-thiophosphoric acids, e. g., di-tolyl monothiophosphoric acids, di-(isopropyl-phenyl) monothiophosphoric acids; the aliphatic phosphoric acids, e. g., di-ethyl phosphoric acid and di-n-butyl phosphoric acid; the aromatic phosphoric acids, e. g., di-phenyl phosphoric acid and di-p-tolyl phosphoric acid; the organic acids of phosphorus containing at least one carbon to phosphorus bond, e. g., di-propyl phosphinic acid, di-ethyl dithiophosphinic acid, n-butyl phosphonic acid, phenylphosphonic acid, di-phenyl dithiophosphinic acid, etc.; the aliphatic phosphorous acids, e. g., mono-n-butyl phosphite, mono-ethyl trithiophosphite, di-ethyl monothiophosphite, etc.; the aromatic phosphorous acids, e. g. mono-phenyl phosphite, di-p-tolyl trithiophosphite, etc.

Additional examples of compounds which can be employed as promoters are given in the following U. S. patents: 2,174,110; 2,174,111; 2,174,492; 2,174,505; 2,174,506; 2,174,507; 2,174,508; 2,174,509; 2,202,791, 2,228,598, 2,265,163; 2,276,097; 2,319,121; 2,321,022; 2,333,788; 2,335,259 and 2,337,552.

However, it is to be understood that the above enumerated ionizable organic compounds and the alkaline earth metal salts thereof or aquasalts are not all equivalent as promoters, but that under certain conditions some are more effective than others.

*The initial inorganic aquasalt used in the process*

The salt-forming compounds which are employed to impart to the process mass and complex the specified amount of metal may be broadly defined as inorganic alkaline earth metal compounds wherein anionic radicals may be, for example, hydroxyl, oxide, carbonate, bi-carbonate, sulphide, hydrosulphide, halide, hydride, amide, basic carbonate, etc. Of the inorganic alkaline earth metal compounds, good results are obtained with those having a water solubility of at least about 0.0003% at 50° C., and preferably at least about 0.006%. Still more preferred are those inorganic alkaline earth metal compounds, saturated aqueous solutions of which give an alkaline reaction or pH value greater than 7.

To further illustrate the large number and variety of classes of inorganic compounds which can be employed, specific examples thereof are enumerated below.

The alkaline earth metal inorganic compounds include the barium containing compounds such as barium hydroxide, barium oxide, barium sulfide, barium carbonate, barium bi-carbonate, barium hydride, barium amide, barium chloride, barium bromide, barium nitrate, barium sulfate, barium borate, etc.; the calcium containing compounds such as calcium hydroxide, calcium oxide, calcium sulfide, calcium carbonate, calcium bicarbonate, calcium hydride, calcium amide, calcium chloride, calcium bromide, calcium nitrate, calcium borate, etc.; the strontium-containing compounds such as strontium hydroxide, strontium oxide, strontium sulfide, strontium carbonate, strontium bicarbonate, strontium amide, strontium nitrate, strontium hydride, strontium nitrite, etc. The corresponding basic salts of the above described compounds are also intended, however, it should be understood that the inorganic alkaline earth metal compounds are not equivalent for the purposes of the present invention, because under certain conditions some are more effective or desirable than others.

*Acidic treatment useful for modifying the metal complex*

The acidic treatment of this invention may be used to modify the chemical composition of this initial inorganic aquasalt in the metal complex. For example, if the initial inorganic aquasalt is an alkaline earth metal hydroxide, treatment of the initial metal complex with a typical acidic reagent, $CO_2$, will convert the hydroxide to the carbonate. Thus, the following equations illustrate this reaction:

(I) $QM_z(AO)_y(OH)_x + CO_2 \rightarrow QM_z(AO)_y(CO_3)_x + H_2O$

A second function of the acidic treatment is to modify the ratio $x/y$, the ratio of inorganic aquasalt (AI) to organic aquasalt (AO) in the complex. In changing this ratio, the character of the inorganic aquasalt present may also be changed as illustrated in the above equation. To illustrate this particular aspect the following equation is presented:

(II-1) $\quad QM_z(AO)_b(AI)_c + a(CO_2) \rightarrow$
(II-2) $\quad QM_z(AO)_{b-a}(AI)_{c+a} + aH(AO)$ It will be noted that in Formula II-1

$$\frac{x}{y} = \frac{c}{b}$$

in Formula II-2

$$\frac{x}{y} = \frac{c+a}{b-a}$$

and therefore, $x/y$ is greater in Formula II-2.

The particular effect of the acidic treatment depends on the relation of the ionization constant of said acidic reagent with respect to the ionization constants of the acids of (AO) and (AI). When the ionization constant of the acidic reagent is greater than the ionization constant of the acid of (AI), but less than the ionization constant of the acid of (AO); the reaction takes place according to Equation I above. For example, the conditions set forth in the Equation I above would prevail in the following specific reaction:

$QM_4(C_6H_5COO-)_1(OH)_2 + CO_2 \rightarrow$
$\qquad QM_4(C_6H_4COO-)(\frac{1}{2}CO_3)_2 + H_2O$ When the ionization constant of the acidic reagent is greater than the acid of (AO) and either greater than or less than the ionization constant of the acid of (AI), i. e., non-critical in this latter respect, the equations set forth under (II) above will occur. For example, this particular set of conditions is realized in the following specific example:

$2QM_5(C_6H_5O-)_2(\frac{1}{2}CO_3)_2 + CO_2 \rightarrow$
$\qquad QM_5(C_6H_6O-)_1(\frac{1}{2}CO_3)_3 + 2C_6H_5OH$ The metal complexes produced in accordance with the equations given under (II) above have been found to be particularly useful in the preparation of permanently oil-soluble products. In order to give a better understanding of the complicated reactions which may occur therein, the following discussion is presented.

As previously indicated, one form of the process of the present invention includes the step of treating the immediate complex product with an acidic material for the purpose of liberating from the complex at least a portion of the anion of the material previously referred to as the promoter. A particularly effective acidic material which has been utilized for this purpose is carbon dioxide. We are aware of the fact that the prior art suggested transforming a sodium hydroxide-calcium sulphonate complex into the sodium carbonate-calcium sulphonate complex or the corresponding bicarbonate complex by blowing the hydroxide complex with carbon dioxide at elevated temperatures.

In our process, the step of treating with an acidic material such as carbon dioxide or air has the effect of freeing from the immediate complex product formed at least a portion of the anion of the promoter used. The nature of the product formed by regenerating from the immediate end product a portion of the anion of the promoter material leaves that complex with a composition which is quite different from the other prior art metal organic complexes previously produced. It is recognized that in accordance with the present invention, the alkaline earth metal salt of the ionizable organic compound can be employed as the promoter in forming the salt complex. However, when such a salt is used as the promoter and the resulting complex is treated with an acidic material, a portion of the anion of the organic compound is freed from its salt. The acid treating step referred to in this paragraph is represented by Formula II above.

For the purpose of releasing from the complex a portion of the anion of the ionizable organic compound used as a promoter, an important feature or characteristic of the acidic material is that it must, when present in the mass containing the complex, possess an ionization constant higher than the ionizable organic compound used as the promoter or used in forming the organic aquasalt.

The acidic material usually employed is a liquid or a gas. The liquids can include the strong or weak acids, such as, for example, hydrochloric, sulphuric, nitric, carbonic acids, etc., whereas the gas is for the most part an anhydride of an acid or an "acid anhydride gas."

The following are additional specific examples of acidic materials, viz.: HCl, $SO_2$, $SO_3$, $CO_2$, air (considered acidic because of $CO_2$ content), $NO_2$, $H_2S$, $N_2O_3$, $PCl_3$, $SOCl_2$, $ClO_2$, $H_2Se$, $BF_3$, $CS_2$, COS, etc.

Preferably the inorganic aquasalt is selected from the class consisting of the alkaline earth metal derivatives of carbonic acid, water sulfurous acid, dithiocarbonic acid, and sulfuric acid.

It is to be understood, however, that all acidic materials are not equivalent for the purposes of the present invention, but that under certain conditions, some are more effective or desirable than others.

The complex of the present invention can be produced by using the same alkaline earth metal in the oilsalt promoter and inorganic compound; or such complexes can be derived from components containing dissimilar alkaline earth metals. In some instances it is desirable to employ a mixture of oilsalts which contain at least two or three dissimilar alkaline earth metals; or the same distribution of metals can be obtained by varying the type of promoter and/or inorganic compound in various combinations with the oilsalt. It is therefore possible to employ various combinations of dissimilar alkaline earth metals in the starting materials used in preparing the complex product.

From the numerous examples given above as specific embodiments of the various processes and complexes of our invention it will be observed that four principal processes have been illustrated by which the several complexes may be produced.

The first of such processes, as represented by Examples Nos. 1, 3–10, 12, 14–22, 34–37, 41–43, 45, 46, 49, 52, 53, 55 and 56 comprises the reaction of an oilsalt and compounds which form the aquasalts.

The second method, as represented by Examples Nos. 47, 48, 50, 51 and 54, utilizes the additional step of reacting the filtered end product of the first process, with an acidic material. The acidic material may have the effect, as stated above, of replacing part of the anion of the organic aquasalt from the complex without any substantial change in the metal ratio of the complex. The liberation of such anion by this step of acid treatment may be followed by a recovery, as by distillation, of the organic salt forming compound corresponding to the anion of the organic aquasalt.

In the third method, represented by Examples Nos. 11, 13, 23–33, 38–40, 44, 57 and 58, the complex formed by the first named process is treated with an acidic material prior to filtration, i. e. in the presence of uncombined inorganic metal compound present in the process mass. When following the procedure of this third method, at least some of the organic aquasalt remains unconverted in the complex. Any or all of the anion of the organic aquasalt which may be liberated by this acid treatment may be removed, as by distillation, as the corresponding organic salt forming compound, or it may be permitted to remain in the product. This acid treating step forms at least some of the inorganic aquasalt present in the complex which forms the end product.

The fourth method, represented by Examples Nos. 26–29, 31, 33 and 56, comprises reacting a complex of an oilsalt; an organic aquasalt of a relatively strong organic salt forming compound and an inorganic aquasalt of a relatively weak salt forming compound with an acidic material of such strength that it will react with a salt forming compound from which the inorganic aquasalt was formed whereby the latter is modified by the acid treating step whereas the relatively stronger organic aquasalt remains unaffected.

*Process conditions*

When carrying out the first of the four different processes outlined above, the salt complex is prepared by combining the reactants in the presence of water. The water can be present as a result of addition thereof to the mixture, or liberated from either the essential components or other additionally present compounds as a result of being subjected to heat. However, it is preferred to add water to the mixture to effect salt complex formation. It has been found that the metal complex can be prepared when using small quantities of water such as about 1 mole of water per mole of inorganic metal compound. However, more usually about 5 to 50, and preferably about 15 to 30, moles of water per mole of inorganic metal compound are used.

Generally the complex formed with the inorganic alkaline earth metal compound, the oil-soluble organic acid or the alkaline earth metal salt thereof, and the promoter is prepared by heating the components in the presence of water at a superatmospheric temperature while insuring thorough mixing and then still further heating said mixture to substantially remove all of the water. At least five variations of the previously outlined four processes are available by which the complex can be formed, namely:

(a) The promoter is added to the oilsalt, followed by addition of an aqueous solution or suspension of the initial inorganic aquasalt; the mixture is held at a superatmospheric temperature for a reasonable length of time while effecting thorough mixing, and then the total mixture is further heated to remove substantially all water which might be present;

(b) The initial inorganic aquasalt in a dry state is added to a mixture of oilsalt or the corresponding acid thereof, promoter and water heating while insuring thorough mixing, and then further heating to remove substantially all of the water;

(c) The acid of the desired oilsalt is mixed with the promoter, then an aqueous solution or suspension of the inorganic alkaline earth metal compound is added thereto, the mixture is heated and agitated at a superatmospheric temperature for a time sufficient to insure thorough mixing, and followed by subjecting the total mixture to dehydration conditions in order to remove substantially all of the water;

(d) In any of the methods discussed herein for preparing the metal complex, a substantial increase in metal content is usually effected by treating the mass containing the complex product with an acidic material just after substantial amounts of water are driven off and just before the mass is filtered.

(e) The sediment formed from any of the aforementioned methods can be employed either alone or with additional promoter in any of the methods given above.

The conditions to be observed in carrying out the remainder of the four processes, above identified, will be self-evident from the processes themselves and the specific examples which have been indicated representative of such processes.

In all of the methods described above for preparing the metal complex, the step of removing substantially all of the water which is present is accomplished at a temperature not substantially in excess of 350° C., preferably about 110 to 200° C. The technique employed to remove the water includes, for example a conventional flash "stripping" operation which involves passing the material in a thin film state over a large heated area of glass, ceramic, or metal; heating under subatmospheric pressure as well as heating under either atmospheric or superatmospheric pressure. At a later stage, the acidic material when used in gaseous form, may be used to remove the last portion of water. It can therefore be seen that the temperature as well as the time for effecting substantial removal of water will vary considerably depending on the amount of material being processed and on the technique employed therefor. Generally, the time required to effect substantial removal of water is at least about 15 minutes or less and can be as high as 10-15 hours or more. Usually, however, it is most convenient to employ atmospheric pressure for such an operation, and consequently it requires about 1 to 5 hours to remove substantially all of the water from the process mixture. It was observed that satisfactory metal complexes are obtained when using any of the techniques described above, and that the final water content can be up to about 2% or more.

Usually, as indicated above, the components are combined and agitated at an elevated temperature to insure thorough mixing and then water is removed therefrom. It should be understood that the process to form the metal complex can be effected without the preliminary heating and mixing period, if desired. It is therefore not essential to this invention to have such a preliminary step because all that appears necessary is to mix the components and remove substantially any water which is present.

*Relationships between the various amounts of the several components in the complex*

For the purposes of this specification and the appended claims, the relative amounts of starting material (oil-soluble organic acid or the alkaline earth metal salt thereof) and promoter is expressed in the "ratio of equivalents" of the latter to the former. In accordance therewith, the ratio of equivalents of promoter to starting material is broadly from about 0.01 to 10, more usually from about 0.02 to 5.0, and preferably from about 0.05 to 3.0.

It will be observed that the complexes of this invention comprise in chemical combination the following:

$$Q.M_z.(AO)_y.(AI)_x$$

or

Oilsalt—organic aquasalt·inorganic aquasalt

with the total metal (M) present attaches to the anions of each of such salts.

On this basis, $y$ should be from .01 to 10 and more desirably from .02 to 5.0 and preferably from .05 to 3.0.

$x$ is always greater than $y$. When $y$ is less than 1, then $x$ should be at least $1.5y$. When $x$ is one or more, then $x$ should be equal to at least $y+.5$. In most instances, $x/y$ should be equal to 1.5 and preferably at least 4.0. As indicated above, metal (same or different) will be combined in each of the three salts. The ratio of the total metal present to the metal present in the oilsalt is referred to for convenience as the metal ratio. All of the complexes of this invention are characterized by a metal ratio greater than 1 with best results secured when such metal ratio is above 4.

When a complex is formed which has ratios of the type referred to above which lie outside of the values given, such complexes will be found undesirable for various reasons. In most cases, complexes which have ratios falling outside of the values given will be oil insoluble or unusable for the purposes. Experimental data which establishes as critical the values from the several ratios given above is demonstrated by the following examples:

EXAMPLE 63

A mixture of 343 grams of petroleum sulfonic acid and 50 grams of mineral oil was heated to 85° C. then treated with a mixture of 64 grams of barium hydroxide, 94 grams of water and 21.4 grams of acetic acid (ratio of equivalents of inorganic aquasalt to organic aquasalt, 0.03). One thousand grams of mineral oil was added and the mixture was heated at 95–120° C. for two hours, then dried at 150° C. The reaction mixture was cooled to 95°, 16 grams of water was added, and the mixture was dried again at 150° C. The product was oil-insoluble and grease-like in consistency.

EXAMPLE 64

A mixture of 343 grams of petroleum sulfonic acid and 50 grams of mineral oil was heated to 85° C. then treated with a mixture of 93 grams of water, 64 grams of barium hydroxide and 10.7 grams of acetic acid (ratio of equivalents of inorganic aquasalt to organic aquasalts, 1.04) and heated to 105° C. Five hundred grams of mineral oil was added and the mixture was dried at 140° C. while being treated with a stream of carbon dioxide until the mixture was substantially neutral. The mixture was cooled to 95° C., 16 grams of water was added and this mixture was dried again at 150° C. The product was oil-insoluble and grease-like in consistency.

EXAMPLE 65

A mixture of 1530 grams of a 30% oil solution of barium petroleum sulfonate having a 7.6% sulfate ash, 35.3 grams of acetic acid, 270 grams of barium oxide sufficient to make the ratio of equivalents of inorganic aquasalt to organic aquasalt equal to at least 3.5 in the end product and 220 grams of water was heated at 100–105° C. for one hour, then at 150° C. for one hour. A stream of carbon dioxide was blown through the mixture at 150° C. for 45 minutes, at which point the mixture was substantially neutral. The product mixture was filtered, yielding oil-soluble, viscous liquid, possessing the following properties:

Basic No. _____ 0.49
Per cent sulfate ash _____ 24.25
Metal ratio _____ 3.96
Empirical formula, $QM_{3.96}(AO)_{0.59}(AI)_{2.37}$ As indicated in the section entitled "Acidic treatment useful for modifying the metal complex," treatment of the salt complex with an acidic material is done in instances where it is desired to change the character of the total aquasalt present in the complex and/or alter the ratio of inorganic aquasalt to organic aquasalt. This treatment is effected at a temperature of from about 25 to 250° C., preferably from about 50 to 170° C. and usually employing from about 0.5 to 20% of acidic material, based on the weight of metal complex. The time of treatment with the acidic material can vary considerably depending on the desired result. As would be expected, short periods of treatment may cause only partial liberation or release of ionizable organic compound or small decreases in the basic number of the metal complex. However, in general, periods of treatment will range from about 0.25 to 30 hours or more. In most cases, and particularly where it is desired to recover the promoter, the amount of acidic material used should be at least equivalent to the amount of metal present as the salt of the ionizable form of promoter. It is to be understood, of course, that the liberation of the promoter from its salt can only take place when the acidic reagent has a higher ionization constant in the process mass than the salt-forming compound of the organic aquasalt.

To substantially increase the metal content of the salt complex, it may be desirable to treat the total mass with an acidic material just prior to filtering same. This treatment may conveniently be effected at a temperature of from about 25° to 250° C. preferably from about 50° to 170° C., using from about 0.5 to 20% of acidic material, based on the total mass, and for a period of from about 0.25 to 30 hours. The acidic material employed is preferably an acid anhydride gas, as defined hereinabove. Treatment with the acid anhydride gas may be accelerated by superatmospheric pressure.

As indicated above, in order to facilitate an understanding of the amount of metal which can be present in the salt complex, the "metal ratio" is defined as the ratio of the total metal in the salt complex to the amount of metal which is in the form of a normal salt of the oil-soluble organic acid. In accordance therewith, the salt complex as of this invention will have metal ratios greater than 1 and up to 9 or more, preferably from about 2 to 8. As for the finished salt complex which is treated after filtration with an acidic material, the metal content is substantially the same as in the complex prior to treating. Consequently, the same metal ratios as given above will apply to such treated product.

By reason of the high metal ratio of the complexes produced in accordance with this invention, the following electronic theory is suggested as a possible explanation of how the metal is held within the metal complex. It is to be understood, however, that such theory is advanced for the purpose of offering explanations, and is not to be construed as a limitation on the scope of the present invention.

In the following equations, AO represents one hydrogen equivalent of the anion of an organic aquasalt and M represents an alkaline earth metal.

For example, in the case of the neutral sulphonate, the charges are distributed as follows:

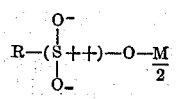

The electron octets around the two oxygen atoms which are not attached to a metal atom give to each of these atoms a unit negative charge, thus leaving the sulphur atom with a double positive charge.

When the sulphonate, excess inorganic metal compound, promoter, and water are reacted according to the present invention, a basic salt (AO)—M—OH is presumed to be formed. This normally oil-insoluble salt dissolves in the reaction mixture because of the electronic attracting force known as a hydrogen bonding.

Initially the following reactions may occur:

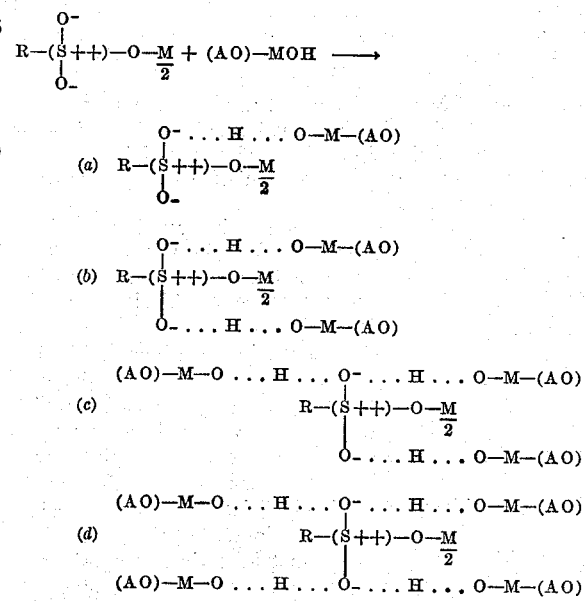

Any one of the above structures may be influenced by the presence of excess $M(OH)_2$ in such a manner that the bond between (AO) and M is broken, thereby releasing (AO) to serve again in promoting the incorporation of more M in the complex. Thus, the preparation of the organic metal complex having the empirical formula $Q$—$M_5(AO)_1(AI)_3$ can be explained by the following series of equations:

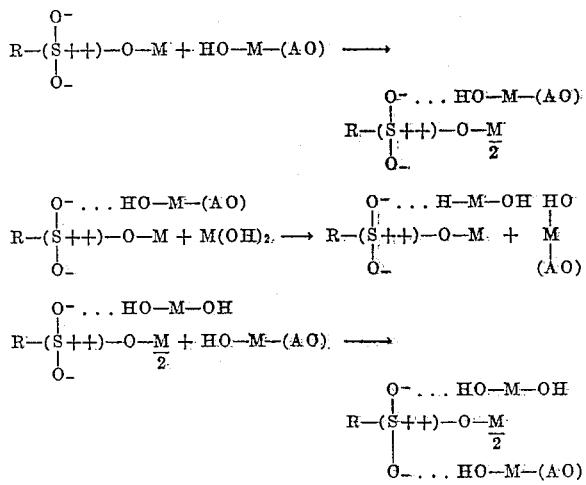

According to this electronic explanation, the (AO)⁻ anion of the aquasalt (AO)—M—OH appears to function as a carrier for the M(OH)₂, and thus facilitating the communicating of the M(OH)₂ into close positions with the negatively charged oxygen atoms of the sulfonate radical.

It will be noted that the above theoretical structures can be represented by the empirical formula:

$$Q-M_z(AO)_y(AI)_x$$

and in the last theoretical structure shown:

$Q = RSO_3$—;
$M$ = metal;
$(AO)$ = one hydrogen equivalent of the anion of at least one organic aquasalt, for example, $C_6H_5O$—, $C_4H_9C_6H_5O$—, etc.;
$(AI)$ = one hydrogen equivalent of the anion of at least one inorganic aquasalt, for example, —OH, —O—, etc.;
$z = 5$;
$y = 1$;
$x = 3$.

It will be readily appreciated that $z$, $y$, and $x$ may often be non-integral values in the actual practice of the invention, since the finished metal complex material may and, in fact, usually does comprise a mixture of two or more of the above structures.

Having thus described the present invention by furnishing specific examples thereof, it is to be understood that no undue limitations or restrictions are to be imposed by reason thereof, but that the scope of this invention is defined by the appended claims.

The salt complexes produced in accordance with the present invention can be employed in lubricants including oils and greases, and for such purposes as in crankcases, transmissions, gears, etc. as well as in torque converter oils. Other suitable uses for such complexes are in asphalt emulsions, insecticidal compositions, fire-proofing and stabilizing agents in plasticizers and plastics, paint driers, rust inhibiting compositions, pesticides, foaming compositions, cutting oils, metal-drawing compositions, flushing oils, textile treatment compositions, tanning assistants, metal cleaning compositions, emulsifying agents, antiseptic cleansing compositions, penetrating agents, gum solvent compositions, fat splitting agents, bonding agent for ceramics and asbestos, asphalt improving agents, flotation agents, improving agents for hydrocarbon fuels such as e. g., gasolene and fuel oil, etc.

More particularly, the complexes of this invention are especially adapted for the preparation of lubricants, paint driers and plastics, particularly the halogen bearing plastics. In these respects, the salt complex can be employed in the following concentrations based upon the weight of the total composition.

|  | Broad Range | Usual Range | Preferred Range |
|---|---|---|---|
|  | Percent | Percent | Percent |
| Lubricant | 0.01–20 | 0.2–15 | 0.5–10 |
| Stabilizing Agent for Plastics | 0.05–5 | 0.1–3 | 0.2–2 |
| Paint Drier | 0.2–25 | 0.5–20 | 1.0–15 |

*Lubricant containing organic metal complexes*

While the metal complexes of the present invention are useful per se as improving agents for lubricating greases and oils, especially mineral lubricating oils intended for use in the crankcases of internal combustion engines, they are most advantageously employed in combination with one or more additional improving agents of the prior art such as, for example, the numerous prior art oxidation inhibitors, detergents, extreme pressure agents, rust inhibitors, and oiliness agents.

In addition to the above-named types of cooperating improving agents, the present invention also contemplates the inclusion, in the finished lubricant, of materials intended to modify the physical characteristics of the mineral lubricating oil base. Examples of such materials are foam inhibitors, pour point depressants, viscosity index improving agents, and odor improving agents. Since the types of materials useful as physical property improving agents are well known to those versed in the lubricant art, it is deemed unnecessary to lengthen the specification unduly by a recitation of the same.

Particularly effective lubricating oils for the crankcases of internal combustion engines can be made by incorporating, in suitable mineral lubricating oils, thiophosphate salt-esters and/or phosphorus sulfide treated unsaturated organic materials along with the metal complexes of the present invention. From the viewpoint of cost, effectiveness, and commercial utility, the most desirable thiophosphate salt-esters for use as oxidation and corrosion inhibitors along with materials of the present invention in lubricating oils are dithiophosphate salt-esters of the general formula

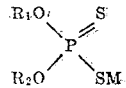

wherein $R_1$ and $R_2$ are the same or different organic radicals and M is one equivalent of a metal, especially a metal selected from Group II of the Mendeleef Periodic Table and most desirably either zinc or barium. In this connection reference may be made to the dithiophosphate salt-esters disclosed in U. S. Patents 2,261,047; 2,329,436; 2,344,392; 2,344,393; 2,344,394; 2,344,395; 2,342,572; 2,347,592; 2,361,746; 2,358,305; 2,364,283; 2,364,284; 2,365,938; 2,382,775; 2,386,207; 2,373,811; 2,410,650; 2,417,562; and 2,438,876.

Particularly useful in this respect are dithiophosphate salt-esters wherein $R_1$ and $R_2$ of the above formula are different organic radicals, which materials are the subject of pending applications Serial No. 250,959, filed October 10, 1951, now abandoned, and Serial No. 251,139, filed October 11, 1951, by Fred. C. Goldsmith, and which applications have an assignee common to the instant application.

Where such salt ester materials, viz. those which contain dissimilar organic radicals, are used it is necessary only that the average number of carbon atoms per atom of phosphorus in the salt ester material be 7.6 or more. Thus it is not only possible, but entirely feasible to utilize such inexpensive alcohols as ethyl, propyl and butyl alcohols in the preparation of these dithiophosphate salt ester materials. The use of dithiophosphate salt ester materials in which $R_1$ and $R_2$ of the above general formula are the same requires the utilization of organic radicals containing a minimum of six carbon atoms. Oil-solubility considerations govern the above minimum carbon atom contents.

Phosphorus sulfide treated unsaturated organic materials useful in conjunction with the metal complexes of the present invention include, for example, phosphorus sulfide treated acyclic and cyclic unsaturated hydrocarbons and phosphorus sulfide treated unsaturated esters, acids and ketones. Particularly valuable products may be obtained by reacting from 2 to 6 moles of at least one terpene hydrocarbon with at least one mole of phosphorus sulfide, especially $P_2S_5$. Particularly good results are secured by the employment of the products obtained by reacting about 3 to 5 moles of pinene and/or turpentine with one mole of $P_2S_5$ for about 1 to 6 hours, preferably about 4 hours, at about 100° C. to 160° C., preferably about 140° C. Such phosphorus sulfide treated materials may be further treated with reagents such as water, alcohols, phenols, or metallic bases to yield end products having enhanced lubricant improving properties for certain applications. All of the aforesaid phosphorus sulfide reaction products are well known in the lubricant improving agent field and have found application primarily as addition agents to reduce the corrosive action of lubricating compositions toward sensitive bearing metal alloys. Additional information on the preparation and utility of these materials may be had by reference to U. S. Patents 2,278,719; 2,315,529; 2,316,078; 2,316,079; 2,316,080; 2,316,084; 2,316,088; 2,316,089; 2,331,923; 2,356,073; 2,356,074; 2,367,468; 2,375,315; 2,377,955; 2,379,312; 2,379,313; 2,383,494; 2,383,495; 2,383,498; 2,392,252; 2,392,253; 2,406,575; 2,409,877; 2,409,878; 2,416,281; and 2,421,631.

In addition to thiophosphate salt-esters and phosphorus sulfide treated unsaturated organic materials, which products have been found to be of particular utility for use in conjunction with the metal complexes of the present invention in lubricants, it is also contemplated to use various other prior art improving agents belonging to the classes of materials known to be useful as detergents, corrosion inhibitors, oxidation inhibitors, and oiliness agents.

Many examples of prior art materials belonging to the classes of detergents, corrosion inhibitors, and oxidation inhibitors which may be used advantageously in combination with the metal complexes of this invention in lubricants may be found in articles by V. A. Kalichevsky (Petroleum Refiner, volume 28, No. 9, pages 88 to 93 inclusive, September 1949) and J. Harold Byers (National Petroleum News, February 10, 1937, pages 67 to 70 inclusive). In the interest of not lengthening the present specification unduly, it is intended that the improving agents therein disclosed be considered as forming a part of our disclosure.

The metal complexes of the present invention can also be used advantageously in combination with extreme pressure agents and optionally oiliness agents and rust inhibitors, for the preparation of compositions useful as lubricants in metal-working and wire-drawing operations and in the gears of automotive vehicles, industrial speed reducers, oil well drilling equipment, and the like, where relatively moving metal surfaces are subjected to high unit pressures which would normally tend to weld or score said metal surfaces.

The following table lists many types and specific examples of materials which have been found to be useful as extreme pressure agents. These materials either singly or in combination, may be used along with the metal complexes of the present invention and suitable lubricating oil bases for the preparation of improved extreme pressure lubricants.

ORGANIC SULFUR COMPOUNDS

Thio derivatives of organic oxygen compounds

I. Classified according to nature of attachment of sulfur atom to the molecule:
  A. Sulfur atom directly attached to one or more carbon atoms, as in the case of compounds containing the —S—R radicle where R is hydrogen or an organic radicle:
    1. Thio-esters and analogous compounds, e. g.,
      (a) Alkyl sulfides—
        Dibutyl sulfide
        Diamyl sulfide
        Dilauryl sulfide
        Methyl lauryl sulfide
        Dicyclohexyl sulfide
      (b) Aryl sulfides—
        Naphthyl amyl sulfide
        Phenyl ethyl sulfide
      (c) Thio-acetals (mercaptals)—
        Thio-acetal
        Acetone mercaptal
        Phenyl benzyl thio-acetal
        Di-amyl thio-acetal
        Dimethyl benzene aldehyde thio-acetal
        Dibenzyl aldehyde thio-acetal
      (d) Thio-cyanates (R—S—CN)
      (e) Aromatic substituted aliphatic sulfides—
        Benzyl sulfide
        Zylyl sulfide
    2. Compounds containing the —C—SH radicle, e. g.,
      (a) Thio-alcohols and thiophenols (mercaptans)—
        Alkyl mercaptans, such as:
          The amyl mercaptans
          The heptyl mercaptans
          The octyl mercaptans—
            n-Octyl mercaptan
            Capryl mercaptan
            2-ethyl hexyl mercaptan
          Lauryl mercaptan
          Cetyl mercaptan
          Methyl cyclohexyl mercaptan
          Cyclohexyl mercaptan
          Amyl cyclohexyl mercaptan
          Cyclohexyl methyl mercaptan
        Aryl mercaptans, such as:
          Phenyl mercaptan
          Diethyl phenyl mercaptan
          The naphthyl mercaptans—
            -Methyl naphthyl mercaptan
            Capryl naphthyl mercaptan
            Wax naphthyl mercaptan
        Aromatic substituted aliphatic mercaptans, such as:
          Benzyl mercaptan
          Phenyl ethyl mercaptan
          Ethyl phenyl ethyl mercaptan
          Diphenyl methyl mercaptan
          Triphenyl methyl mercaptan
      (b) Dithio-alcohols and dithio-phenols (dimercaptans)—
        Dimercapto butane
        Amyl dimercapto naphthalene
      (c) Mercapto acids—
        -Mercapto stearic acid
    3. Compounds containing the C=S radicle, e. g.,
      (a) Thio-aldehydes, e. g.—
        Thio-stearaldehyde
        Thio-lauraldehyde
        Thio-benzaldehyde
        Thio-ethyl benzaldehyde
        Thio salicylaldehyde
        Thio-capryl salicylaldehyde
        Thio-furfuraldehyde
        Thio-tetrahydrofurfuraldehyde
      (b) Thio-ketones, e. g.—
        Di-amyl thio-ketone
        Di-lauryl thio-ketone
        Thiobenzophenone
        Thioacetophenone
      (c) Thio-organic acids, and esters and salts of them; such as—
        Thio-fatty acids, e. g.:
          Thio-stearic (thiolic and thionic)
          Thio-oleic (thiolic and thionic)
          Dithio-stearic
          Dithio-oleic
          Thio ricinoleic (thiolic and thionic)
        Thio-aromatic acids, e. g.:
          Thio-benzoic acid
          Thio-salicylic acids
          Thio-phthalic acids
          Dithio phthalic acids
        Esters of the above acids, e. g.:
          Amyl thio-acetate
          Lauryl thio-acetate
          Ethyl dithio-benzoate
          Methyl thio-stearate
          Amyl-thio-benzoate
          Lauryl thio-benzoate
          Lauryl thio-salicylate
          Dicapryl thio-phthalate
          Dilauryl thio-phthalate
          Ethyl mercapto-stearate
        Salts of the above acids, e. g.:
          Sodium dithio-benzoate Sodium dithio-propionate
Calcium thio-stearate
Esters and salts of thio-carbonic acids, e. g.:
  Diethyl dithiocarbonate
  Diphenyl thiocarbonate
  Diphenyl tri-thiocarbonate
  Diamyl tri-thiocarbonate
  n-Octyl zanthate
  2-ethyl hexyl zanthate
  Capryl zanthate
  Lauryl zanthate
  Ethyl phenyl zanthate
  Benzyl zanthate
  Stearyl zanthate
  Sodium zanthate
  Potassium zanthate
  Calcium zanthate
Organic thio-cyanates and iso-thiocyanates, such as:
  Benzyl thiocyanate
  Benzyl isothiocyanate
  Butyl thiocyanate
  Butyl isothiocyanate
  Lauryl thiocyanate
  Lauryl isothiocyanate (d) Thio-amides, thio-anilides, and thio-ureas, e. g.—
  Thio-acetanilide
  Thio-acetamide
  Thio-stearanilide
  Thio-benzanilide
  Thio-carbanilide
  Thio-urethane
  Phenyl thio-urethane
  Thio-urea
  Di-amyl thio urea
  Amyl diphenyl thiocarbamate (e) Compounds in which the C=S group is included in a ring structure, e. g.—
  Thio-quinone
  Thio-naphthaquinones
  Thio-anthraquinone
  Thio-phthalic anhydride
  Thio-diphenic anhydride
  Diphenylene thioketone (thio-fluorenone)
  Thio-camphor (f) Carbon bisulfide 4. Compounds in which the —S— radicle forms a part of an organic ring structure, e. g.,
  Thio-phene alcohols
  Thiophene carboxylic acids, and esters and salts of them,
    Lauryl thenoate
    Phenyl thenoate
    Benzyl thenoate
  Thiophene sulfonic acids, and esters and salts of them
  Methyl thiophenes
  Dimethyl thiophene (thioxene)
  Thianthrene (diphenylene disulfides) and related compounds, such as homologues thereof
  Diphenylene sulfide
  Thiazole and derivatives, e. g.—
    Benzothiazole
    Phenyl benzothiazole
    Mercapto benzothiazole
  Thiazine derivatives, e. g.—
    Methyl benzothiazine ("Bio-phen")

5. Sulfur atom attached in the form of an inorganic radicle, e. g.,
  Thio-arsenite
  Thio-phosphite
  Tri-thio-lauryl phosphite
  Thio-phosphate
  Thio-sulfonic acid, and esters and salts
  Thio-sulfinic acid, and esters and salts B. Sulfur attached to molecule through means of some other atom, i. e., in the form of an inorganic radicle, e. g.:
  Thio-arsenate
  Thio-phosphate
  Thio-sulfate
  Thio-sulfite
  Thio-sulfonate
  Sulfate
  Sulfite Of the organic sulfur compounds which do not have stable analogous oxygen counterparts are those included in the following table:

A. Sulfones
  Sulfoxides
  Sulfonic acids, and esters and salts of them
  Sulfinic acids, and esters and salts of them
  Sulfenic acids, and esters and salts of them B. Polysulfides, containing the —Sn— radicle, notably:
1. Alkyl polysulfides, e. g.,
  Dibutyl disulfide
  Dibutyl trisulfide
  Dibutyl tetrasulfide
  Diamyl disulfide
  Diamyl trisulfide
  Dilauryl disulfide
  Dilauryl trisulfide
  Cyclohexyl disulfide 2. Aryl polysulfides, e. g.,
  Diphenyl disulfide
  Diphenyl trisulfide
  Chlor diphenyl trisulfide
  Dinaphthyl disulfide 3. Aromatic substituted aliphatic polysulfides, e. g.,
  Dibenzyl disulfide
  Chlor dibenzyl disulfide
  Xylyl disulfide
  Chlor xylyl disulfide
  Dibenzyl trisulfide
  Dibenzyl tetrasulfide 4. Mixed alkyl-aryl polysulfides, e. g.,
  Amyl benzyl disulfide
  Amyl benzyl trisulfide 5. Higher polysulfides, e. g., those formed from the above (or from sulfides) by the addition of an —S— group or groups.

ORGANIC HALOGEN COMPOUNDS

Halogenated aliphatic hydrocarbons:
  Pentachloroethane
  Heptachloropropane
  Hexachlorobutadiene
  Chlorinated neohexane containing 75% chlorine
  Chlorinated diisobutylene containing 60% chlorine
  Chlorinated kerosene containing 45% chlorine
  Chlorinated hexadecane containing 55% chlorine
  Chlorinated octadecane containing 50% chlorine
  Chlorinated eicosane containing 50% chlorine
  Chlorinated docosane containing 50% chlorine
  Chlorinated foots oil containing 40% chlorine
  Chlorinated mineral oil containing 40% chlorine
  Chlorinated paraffin wax containing 40% chlorine
  Chlorinated petrolatum containing 40% chlorine Halogenated aliphatic acids:
  Dichlorostearic acid
  Dichlorolauric acid
  Dichloropalmitic acid Halogenated aliphatic esters:
  Alkyl dichlorolaurates
  Alkyl dichloropalmitates
  Alkyl dichlorostearates Halogenated aromatic compounds:
  Dichlorobenzene
  Trichlorobenzene
  Dichloronaphthalene
  Trichloronaphthalene
  Polychloronaphthalenes
  Hexachlorodiphenyl ether
  Hexachlorodiphenyl sulfide
  Hexachlorobenzophenone Specific examples of oil-soluble organic phosphorus acids which may be used in the practice of this invention include the following:

ORGANIC PHOSPHORUS COMPOUNDS

Dithiophosphoric acids:
  Diamyl dithiophosphoric acid
  Dihexyl dithiophosphoric acid
  Diheptyl dithiophosphoric acid
  Dioctyl dithiophosphoric acid
  Dinonyl dithiophosphoric acid
  Didecyl dithiophosphoric acid
  Didodecyl dithiophosphoric acid
  Ditetradecyl dithiophosphoric acid
  Dihexadecyl dithiophosphoric acid
  Dioctadecyl dithiophosphoric acid
  Di-(paraffin wax) dithiophosphoric acid
  Dieicosyl dithiophosphoric acid
  Dipentenyl dithiophosphoric acid
  Dioctenyl dithiophosphoric acid
  Didecenyl dithiophosphoric acid
  Dihexadecenyl dithiophosphoric acid
  Di-(methyl-benzyl) dithiophosphoric acid
  Di-(octylbenzyl) dithiophosphoric acid
  Di-(phenyloctadecyl) dithiophosphoric acid
  Di(xenylhexyl) dithiophosphoric acid
  Di-(phenoxyoctyl) dithiophosphoric acid
  Di-(butoxy-ethyl) dithiophosphoric acid
  Bis-(3,5-dichloro-n-octyl) dithiophosphoric acid
  Bis-(2,6-dibromo-n-decyl) dithiophosphoric acid
  Dicyclopentyl dithiophosphoric acid
  Bis-(dimethylcyclopentyl) dithiophosphoric acid
  Dicyclohexyl dithiophosphoric acid
  Di-(methyl-cyclohexyl) dithiophosphoric acid
  Di-(isopropylcyclohexyl) dithiophosphoric acid
  Bis-(diisobutylcyclohexyl) dithiophosphoric acid
  Dinaphthenyl dithiophosphoric acid
  Di-(hydroabietyl) dithiophosphoric acid
  Dicyclopentenyl dithiophosphoric acid
  Di-(methylcyclohexenyl) dithiophosphoric acid
  Diabietyl dithiophosphoric acid
  Di-(tert-amyl-phenyl) dithiophosphoric acid
  Di-(2,4-di-tert-amyl-phenyl) dithiophosphoric acid
  Di-(paraffin wax, phenyl) dithiophosphoric acid
  Di-(lauroxyphenyl) dithiophosphoric acid
  Di-(caprylxenyl) dithiophosphoric acid
  Methyl octadecyl dithiophosphoric acid
  Butyl hexyl dithiophosphoric acid
  Isopropyl sec-amyl dithiophosphoric acid Monothiophosphoric acids:
  Diheptyl thiophosphoric acid
  Dioctyl thiophosphoric acid
  Dinonyl thiophosphoric acid
  Didodecyl thiophosphoric acid
  Dihexadecyl thiophosphoric acid
  Dioctadecyl thiophosphoric acid
  Di-(paraffin wax) thiophosphoric acid Dihexenyl thiophosphoric acid
Didecenyl thiophosphoric acid
Dihexadecenyl thiophosphoric acid
Diphenethyl thiophosphoric acid
Di-(butyl-benzyl) thiophosphoric acid
Di-(octadecylphenyl) thiophosphoric acid
Diphenoxydecyl thiophosphoric acid
Di-(butoxyphenyl) thiophosphoric acid
Di-(nitrophenyloctyl) thiophosphate
Dicyclopentyl thiophosphoric acid
Dicyclohexyl thiophosphoric acid
Di-(methyl-cyclohexyl) thiophosphoric acid
Dinaphthenyl thiophosphoric acid
Dicyclohexenyl thiophosphoric acid
Butyl hexyl thiophosphoric acid
Amyl cyclohexyl thiophosphate
Isopropyl cyclohexyl thiophosphoric acid Phosphoric acids:
Dihexyl phosphoric acid
Dioctyl phosphoric acid
Didecyl phosphoric acid
Diundecyl phosphoric acid
Didodecyl phosphoric acid
Dioctadecyl phosphoric acid
Dihexenyl phosphoric acid
Dioctenyl thiophosphoric acid
Didecenyl phosphoric acid
Dioctadecenyl phosphoric acid
Dicyclopentyl phosphoric acid
Dicyclohexyl phosphoric acid
Di-(methylcyclohexyl) phosphoric acid
Dicyclopentenyl phosphoric acid
Dicyclohexenyl phosphoric acid
Di-(methyl-cyclohexenyl) phosphoric acid
Di-(phenylbutyl) phosphoric acid
Di-(naphthylethyl) phosphoric acid
Di-(chlorophenyloctyl) phosphoric acid
Di-(propylphenyl) phosphoric acid
Di-(methyl-naphthyl) phosphoric acid
Methyl decyl phosphoric acid
Ethyl dodecyl phosphoric acid
Ethyl methylcyclohexyl phosphoric acid Dithiophosphinic acids:
Dihexyl dithiophosphinic acid
Dioctyl dithiophosphinic acid
Dinonyl dithiophosphinic acid
Ditetradecyl dithiophosphinic acid
Didecenyl dithiophosphinic acid
Dihexadecenyl dithiophosphinic acid
Dicyclohexyl dithiophosphinic acid
Di-(methyl-cyclohexyl) dithiophosphinic acid
Dicyclohexenyl dithionphosphinic acid
Diphenyl dithiophosphinic acid
Ditolyl dithiophosphinic acid
Dinaphthyl dithiophosphinic acid
Amyl hexyl dithiophosphinic acid
Isopropyl heptyl dithiophosphinic acid
Ethyl methylcyclohexyl dithiophosphinic acid Phosphorous acids:
Mono-(paraffin-wax) phosphorous acid
Mono octadecyl phosphorous acid
Mono dodecyl phosphorous acid
Mono octyl phosphorous acid
Methylcyclohexyl phosphite Di-(methylcyclohexyl) phosphite
Capryl phosphite
Dicapryl phosphite In addition to the above specific examples of phosphorus acids, the metal salts of each such acid may be regarded also as further specific examples of materials which may be used as starting materials in the practice of this invention.

While the metal complexes of the present invention find their widest application in the preparation of lubricants intended for use in the crankcases of internal combustion engines, they are also useful in the preparation, as above indicated, of improved extreme pressure lubricants. In addition to these particular applications, the metal complexes of this invention may also be used in the preparation of improved lubricants for specialized uses, such as jet aviation, top cylinder, steam cylinder, steam locomotive, railway car, gas engine, refrigerating machine, hydraulic, compressor, turbine, spindle, and torque converter lubricants.

The lubricating oil base in which the metal complexes of the present invention and, optionally, certain additional improving agents are incorporated may be of synthetic, vegetable, animal, or mineral origin. Because of their low cost, availability, and desirable properties, the mineral oils, i. e. those derived from petroleum, find the widest application in the lubricant field.

This invention as heretofore described also relates to various types of lubricant improving agents and lubricating compositions. There is, at the present time, sundry mineral oils, each best suited from the standpoint of viscosity and other properties for different uses and environments. The oil base of a lubricating composition of the present invention designed for a particular use and environment will preferably comprise a lubricating oil having the characteristics now well recognized as best suited for such use and environment.

In the following tables, particular characteristics of refined mineral lubricating oils best suited for many types of use and climate are disclosed.

The actual upper limit of preferred viscosity index is infinite for most uses. The values given in the following tables indicate the present commercial maximum values.

| Type of Climate | Crankcase | | | Jet Aviation | Top Cylinder | Steam Cylinder |
| --- | --- | --- | --- | --- | --- | --- |
| | Gasoline | Diesel | Aviation | | | |
| Arctic: | | | | | | |
| Preferred viscosity range¹ °F | 90-120/130 | 90-120/130 | 60-90/210 | 25-55/100 | 50-150/100 | 80-120/210 |
| Flash pt. preferably no lower than °F | 300 | 320 | 340 | 225 | 275 | 400 |
| Pour pt. preferably no higher than °F | -50 | -50 | -50 | -70 | -50 | 0 |
| Temperate: | | | | | | |
| Preferred viscosity range¹ °F | 110-400/130 | 110-400/130 | 80-130/210 | 25-55/100 | 50-150/100 | 100-190/210 |
| Flash pt. preferably no lower than °F | 325 | 340 | 360 | 225 | 300 | 500 |
| Pour pt. preferably no higher than °F | 0 | 0 | -10 | -70 | 0 | 50 |
| Tropical: | | | | | | |
| Preferred viscosity range¹ °F | 250-400/130 | 250-400/130 | 120-150/210 | 25-55/100 | 50-150/100 | 100-190/210 |
| Flash pt. preferably no lower than °F | 350 | 360 | 380 | 225 | 300 | 500 |
| Pour pt. preferably no higher than °F | 20 | 20 | 10 | -70 | 20 | 50 |
| Preferred V. I. (Dean and Davis) | 85-120 | 35-120 | 95-130 | 80-150 | | 35-120 |

| Type of Climate | Steam Locomotive | Railway Car | Gas Engine | Refrigerating Machine | Hydraulic | Compressor |
| --- | --- | --- | --- | --- | --- | --- |
| Arctic: | | | | | | |
| Preferred viscosity range¹ °F | 25-45/210 | 40-60/210 | 30-60/210 | 40-80/100 | 90-150/100 | 100-300/100 |
| Flash pt. preferably no lower than °F | 350 | 350 | 350 | 300 | 300 | 325 |
| Pour pt. preferably no higher than °F | -20 | -20 | -20 | -40 | -40 | -40 |
| Temperate: | | | | | | |
| Preferred viscosity range¹ °F | 35-60/210 | 50-70/210 | 40-80/210 | 80-180/100 | 125-300/100 | 200-500/100 |
| Flash pt. preferably no lower than °F | 375 | 350 | 375 | 325 | 325 | 350 |
| Pour pt. preferably no higher than °F | 0 | 0 | 0 | -25 | 0 | 10 |
| Tropical: | | | | | | |
| Preferred viscosity range¹ °F | 35-60/210 | 50-70/210 | 40-80/210 | 80-180/100 | 200-1000/100 | 300-600/100 |
| Flash pt. preferably no lower than °F | 375 | 350 | 375 | 350 | 350 | 350 |
| Pour pt. preferably no higher than °F | 20 | 15 | 20 | -25 | 20 | 20 |
| Preferred V. I. (Dean and Davis) | 35-120 | 35-120 | 85-120 | 85-150 | 85-120 | 85-120 |

¹ Expressed in Saybolt Universal seconds at indicated temperature.

| Type of Climate | Turbine | Spindle | Torque Converter | Gear | |
|---|---|---|---|---|---|
| | | | | Automotive | Industrial |
| Arctic: | | | | | |
| Preferred viscosity range [1]_____°F__ | 120-500/100 | 35-100/100 | 20-80/100 | 30-80/210 | 30-1000/210 |
| Flash pt. preferably no lower than____°F__ | 375 | 275 | 275 | 300 | 300 |
| Pour pt. preferably no higher than____°F__ | −20 | −50 | −50 | −30 | 10 |
| Temperate: | | | | | |
| Preferred viscosity range [1]_____°F__ | 125-500/100 | 70-200/100 | 30-250/100 | 50-140/210 | 50-2000/210 |
| Flash pt. preferably no lower than____°F__ | 400 | 275 | 300 | 325 | 325 |
| Pour pt. preferably no higher than____°F__ | 0 | 0 | −30 | 0 | 20 |
| Tropical: | | | | | |
| Preferred viscosity range [1]_____°F__ | 125-500/100 | 150-300/100 | 30-300/100 | 80-200/210 | 80-2000/210 |
| Flash pt. preferably no lower than____°F__ | 400 | 300 | 300 | 350 | 325 |
| Pour pt. preferably no higher than____°F__ | 20 | 10 | 0 | 20 | 30 |
| Preferred V. I. (Dean and Davis)_____ | 85-120 | 75-120 | 100-160 | 75-120 | 35-120 |

[1] Expressed in Saybolt Universal seconds at indicated temperature.

As indicated earlier, our metal complexes find their widest application in the preparation of lubricants intended for use in the crankcases of internal combustion engines, particularly in combination with other improving agents such as, in the preferred instance, dithiophosphate salt-esters and/or phosphorus sulfide treated unsaturated organic materials.

It is common practice in the lubricant additive industry to prepare a liquid, homogeneous concentrate containing one or more separate improving agents and optionally, a minor proportion of a mineral oil, preferably one of low viscosity. Such liquid concentrates dissolve more readily in lubricating oil bases than do solid improving agents and, in addition, minimize the problems usually associated with the processing, handling, and transportation of solid materials.

Thus the present invention contemplates not only the preparation of finished lubricants containing the metal complexes of our invention, but also the preparation of lubricant improving agents, i. e. concentrates, which when dissolved in suitable lubricating oil bases will yield finished lubricants containing our metal complexes and, optionally, such other improving agents as are desired.

From an examination of the specification it will be noticed that our metal complexes vary widely in metal content, such metal content usually being expressed, for convenience, as percent metal sulfate ash. As a matter of actual practice in the compounding of lubricants from our metal complexes, we have found that the amount of metal in combined form in the lubricant due to the presence of our complex is the critical factor to be considered. Since it has been shown that our metal complexes may differ very substantially in metal content, it follows that in the preparation of a lubricant having a certain fixed proportion of metal due to our complex, one would use less of a metal complex of high metal content than a similar metal complex of lower metal content. To illustrate this point more specifically, 10 parts by weight of a barium complex of 40% barium sulfate ash content dissolved in 90 parts by weight of lubricating oil would yield a lubricant having the same metal content as one prepared by dissolving 40 parts by weight of a barium complex of 10% barium sulfate ash content in 60 parts by weight of lubricating oil.

It becomes apparent then that we can properly define the amounts of our metal complexes desirably present in lubricant improving agents and lubricants only in terms of metal content or a proportional equivalent thereof, for example, metal sulfate ash content. Furthermore, it should be pointed out that the desirable range of such metal or metal sulfate ash content will differ substantially in going from one metal complex, say a barium complex, to a complex of a different metal, say a calcium complex. This situation exists because different metals have different chemical combining weights, and are perforce present in different weight percentages in complexes of our invention wherein the organic acid and promoter material have been fixed both as to identity and amount.

As a consequence of a large number of tests performed on lubricants containing alkaline earth metal complexes of our invention, we have been able to determine the operable ranges of metal content and metal sulfate ash content (due to the presence of our complexes) for both lubricant improving agents and finished lubricants.

In the interest of not unduly lengthening the specification, we set forth only the ranges applicable to barium, since the ranges for the other alkaline earth metals can be readily calculated therefrom by using the factors shown, which take into account the different combining weights of the metals involved:

RANGES FOR WEIGHT PERCENT OF BARIUM SULFATE ASH AND BARIUM (DUE TO BARIUM COMPLEX) IN LUBRICANT IMPROVING AGENTS AND LUBRICANTS

| | Range | | |
|---|---|---|---|
| | broad | intermediate | preferred |
| In lubricant improving agent: | Percent | Percent | Percent |
| barium sulfate ash due to barium complex_____ | 0.75-40 | 1.25-30 | 2.5-20 |
| barium due to barium complex_____ | 0.4-23.5 | 0.75-17.5 | 1.5-12 |
| In lubricant: | | | |
| barium sulfate ash due to barium complex_____ | 0.005-8 | 0.1-6 | 0.02-4 |
| barium due to barium complex_____ | 0.003-5 | 0.006-3.5 | 0.01-2.5 |

For the alkaline earth metals other than barium the corresponding ranges may be calculated from the values given for the barium complexes by multiplying said values by the following factors:

| Alkaline earth metals | Factors for— | |
|---|---|---|
| | sulfate ash values | metal values |
| calcium_____ | 0.584 | 0.292 |
| strontium_____ | 0.785 | 0.635 |

It will be noted from the above data that ranges of the amounts of organic metal complex in the lubricant can be calculated irrespective of the particular metal used. These ranges may be calculated by determining the lowest and highest amounts that can be used considering each of the above metals. The table below represents the contemplated ranges of organic metal complex for lubricants and lubricating improving agents.

RANGES FOR WEIGHT PERCENT OF METAL SULFATE ASH AND METAL (DUE TO METAL COMPLEX) IN LUBRICANT IMPROVING AGENTS AND LUBRICANTS

|  | Range | | |
|---|---|---|---|
|  | broad | intermediate | preferred |
| In lubricant improving agent: | Percent | Percent | Percent |
| metal sulfate ash due to metal complex | 0.38 to 40 | 0.64 to 30 | 1.28 to 20 |
| metal due to metal complex | 0.07 to 23.5 | 0.13 to 17.5 | 0.27 to 12 |
| In lubricant: |  |  |  |
| metal sulfate ash due to metal complex | 0.002 to 8 | 0.005 to 6 | 0.01 to 4 |
| metal due to metal complex | 0.001 to 5 | 0.0011 to 3.5 | 0.02 to 2.5 |

Lubricating compositions containing the metal complexes of our invention, either as the sole improving agent or in combination with other improving agents, have been tested as crankcase lubricants in several types of internal combustion engines. The data accumulated from these tests show the utility of our products as lubricant improving agents:

*Results of engine tests on lubricants containing metal complexes of the present invention*

In many of the engine tests described below, additional improving agents were used in combination with our metal complexes. For convenience, certain of these have been designated as improving agents A, B, C, and D. Their identification is given in the following table:

| Improving Agent | Identification |
|---|---|
| A | Prepared by reacting 4 moles of turpentine with 1 mole of P$_2$S$_5$ for about 4 hours at about 140° C. |
| B | Barium salt of the dithiophosphate diesters prepared by reacting 4 moles of a mixture of six and eight carbon atom alcohols, the mixture having an average of about 14 carbon atoms per atom of phosphorus. |
| C | Zinc di-(4-methyl-sec-amyl) dithiophosphate. |
| D | A mixture of 40 mole-percent of zinc diisopropyl dithiophosphate with 60 mole-percent of zinc di-(4-methyl-sec-amyl) dithiophosphate. |

I. LAUSON ENGINE TESTS

These tests were carried out in a four-cycle, liquid-cooled, single-cylinder gasoline engine 1.5 horsepower manufactured by the Lauson Company of New Holstein, Wisconsin, and bearing the trade designation "Lauson Engine Model H-2." It is typical of the type of engine widely used in power mowers, small-scale farm equipment, and the like.

The lubricant to be tested is placed in the crankcase of the engine, which has been equipped with new piston rings, a new piston, and a new connecting rod bearing. The engine is then started and operated under the following conditions:

Speed _____ 2000 R. P. M.
Load _____ 1.5 brake horsepower.
Air to fuel ratio _____ 13.5 to 1.
Spark advance _____ 30°.
Crankcase oil temperature ___ 225° F.
Cooling jacket temperature __ 345° F.

As the test continues the lubricant level in the crankcase is maintained substantially constant by the addition of fresh lubricant, if necessary, every ten hours. The test has a maximum duration of 240 hours, with an inspection performed every 30 hours beginning at 60 hours. This inspection entails the removal of the piston and connecting rod bearing for an examination of the following items:

(1) Piston cleanliness (alphabetical ratings range from "A" for a perfectly clean piston to "E" for one which is heavily coated with deposits)
(2) Number of rings stuck
(3) Percent filling of oil ring groove
(4) Weight loss of bearing in milligrams If ring-sticking, heavy piston deposits, or excessive bearing corrosion are noticed at any inspection period, the test is discontinued.

The following Lauson engine tests show the beneficial effect produced by adding a metal complex of our invention to a lubricant:

| Lubricant No. | Composition | Lauson Engine Rating | | | | |
|---|---|---|---|---|---|---|
|  |  | Hrs. of test | Piston merit rating | Number of rings stuck | Percent ring filling | Bearing weight loss, milligrams |
| 1 | Solvent-extracted Mid-Continent SAE 30 motor oil, untreated (control). | 60 | CD | 1 | 15 | 142 |
| 2 | 99.21% lubricant No. 1 plus 0.3% improving agent A plus 0.49% improving agent B | 60 | C | 0 | 0 | 16 |
|  |  | 90 | C | 0 | 0 | 20 |
|  |  | 120 | D | 1 | 20 | 29 |
| 3 | 98.29% lubricant No. 1 plus 0.3% improving agent A plus 0.49% improving agent B plus 0.92%[1] of the barium complex of Example 3 | 60 | AB | 0 | 0 | 8 |
|  |  | 90 | AB | 0 | 0 | 23 |
|  |  | 120 | B | 0 | 0 | 45 |
|  |  | 150 | B | 0 | 0 | 59 |
|  |  | 180 | B | 0 | 0 | 66 |
|  |  | 210 | B | 0 | 0 | 76 |
|  |  | 240 | C | 0 | 0 | 95 |

[1] This amount is equivalent to 0.25% barium sulfate ash.

II. CHEVROLET ENGINE TEST

The test procedure adopted for this group of tests is set forth in the CRC L-4-545 specification promulgated by the Coordinating Research Council of New York. This test, which is carried out in a Chevrolet six-cylinder engine of 216.5 cubic inches displacement, has been widely used in the lubricant industry to measure both the stability of a lubricant towards oxidation and the extent to which a lubricant corrodes sensitive alloy bearings of the copper-lead variety. Although the specification sets the duration of the test at 36 hours, it may be continued beyond this point at the option of the operator if the lubricant has not yet become highly corrosive. By the use of such extended operating periods, the severity of the test is increased and one can gain additional information concerning the stability of the lubricant.

The following tests show the utility of our metal complexes in preparing improved crankcase lubricants. It will be noted that the usefulness of our metal complexes is generally enhanced by the addition of other improving agents, particularly those of the dithiophosphate salt-ester and phosphorus sulfide treated unsaturate variety.

| Lubricants compounded from SAE 30 solvent-extracted Mid-Continent motor oil plus the indicated kinds and amounts of improving agents | | | | | | Chevrolet engine test results | | | |
|---|---|---|---|---|---|---|---|---|---|
| Lubricant No. | Improving agent of this invention | | | Additional improving agents | | Hours of test | Engine deposit rating (100= perfectly clean) | Corrosion in milligrams per average whole bearing | Viscosity increase of spent oil, percent |
| | product of— | percent addition on— | | identification | percent addition by weight | | | | |
| | | weight basis | sulfate ash basis | | | | | | |
| 4 | none (control) | | | none | | 36 | 78.5 | 2816 | 80 |
| 5 | Example 6 | 5.49 | 1.27 | do | | 36 | | 212 | 19 |
| | | | | | | 72 | 90.5 | 436 | 27 |
| 6 | do | 2.21 | 0.51 | prior art viscosity index improver | 1.47 | 36 | 91.5 | 28 | [1] 5.7 |
| | | | | improving agent A | 0.12 | | | | |
| | | | | improving agent B | 0.17 | | | | |
| | | | | improving agent C | 0.36 | | | | |
| 7 | Example 8 | 2.5 | 0.96 | none | | 36 | 93 | 900 | 50 |
| 8 | Example 11 | 2.83 | 0.71 | improving agent A | 0.13 | 36 | | 105 | 13 |
| | | | | improving agent D | 0.45 | 60 | 90 | 843 | 24 |
| 9 | Example 19 | 2.13 | 0.71 | improving agent A | 0.13 | 36 | | 353 | [1] 11 |
| | | | | improving agent C | 0.5 | 44 | 88.5 | 653 | [1] 7.6 |
| 10 | Example 25 | 2.79 | 0.71 | improving agent A | 0.13 | 36 | | 106 | 19 |
| | | | | improving agent C | 0.5 | 72 | 89 | 118 | 22 |
| 11 | Example 58 | 2.88 | 0.71 | improving agent A | 0.13 | 36 | | 51 | 17 |
| | | | | improving agent C | 0.15 | 72 | 87.5 | 74 | 22 |
| 12 | Example 39 | 3.79 | 0.98 | improving agent B | 0.36 | 36 | 94 | 80 | 18 |
| | | | | improving agent C | 0.43 | | | | |
| 13 | do | 2.76 | 0.71 | improving agent C | 0.51 | 36 | | 79 | 16 |
| | | | | | | 72 | 87 | 419 | 20 |
| 14 | do | 2.0 | 0.52 | improving agent A | 0.75 | 36 | 92.5 | 40 | 20 |
| 15 | do | 4.0 | 1.03 | do | 0.75 | 36 | 95 | 39 | 40 |
| 16 | do | 2.76 | 0.71 | lauryl pinene sulfenate | 0.7 | 36 | 92.5 | 840 | |
| 17 | do | 2.76 | 0.71 | diisobutenyl petroleum thiosulfonate | 1.0 | 36 | 91 | 565 | 23 |
| 18 | do | 2.76 | 0.71 | di-(nonyl-phenyl) dithiophosphoric acid anhydride. | 1.32 | 36 | 92 | 582 | 27 |
| 19 | do | 2.76 | 0.71 | improving agent A | 0.61 | 36 | | 299 | 6.3 |
| | | | | bis-(diisobutenyl) disulfide | 1.36 | 72 | 95.5 | 375 | 22 |
| 20 | Example 40 | 2.45 | 0.71 | improving agent A | 0.13 | 36 | | 154 | 10 |
| | | | | improving agent C | 0.5 | 72 | 87.5 | 652 | 28 |
| 21 | Example 43 | 3.12 | 0.41 | improving agent A | 0.13 | 36 | 91.5 | 357 | 25 |
| | | | | improving agent D | 0.45 | | | | |
| 22 | Example 48 | 5.6 | 1.27 | none | | 36 | 90.5 | 684 | 35 |
| 23 | do | 4.33 | 0.98 | improving agent A | 0.17 | 36 | 92 | 32 | 12 |
| | | | | improving agent B | 0.36 | | | | |
| | | | | improving agent C | 0.43 | | | | |

[1] Decrease.

III. DIESEL ENGINE TESTS

It is well known in the lubricant industry that a diesel engine places heavy demands on the detergent or cleansing properties of a lubricant and that these demands become very great when the sulfur content of the fuel reaches a value of about 1% or higher. Since a substantial proportion of the diesel fuels presently available to operators of diesel engines contain from 0.75 to over 1% naturally-occurring sulfur, it then becomes important to provide lubricants which will maintain the engine in good operating condition by reducing the build-up of harmful deposits, particularly on the piston and rings.

To explore the utility of our metal complexes in preparing lubricants intended for service in diesel engines, a number of tests were carried out in a diesel engine manufactured by the Buda Company of Harvey, Illinois. This particular engine, designated by the manufacturer as Buda engine Model 1-BD-38, is a single cylinder, liquid-cooled, diesel engine of 7.5 brake horsepower at 1800 R. P. M.

The following operating conditions were adhered to in testing lubricants in the Buda engine:

Duration of test _____ 100 hours.
Load _____ 5 brake horsepower.
Speed _____ 1800 R. P. M.
Fuel type _____ Diesel fuel oil containing approximately 1% naturally-occurring sulfur.
Fuel consumption _____ 3.05 lbs. per hour.
Lubricant temperature ____ 175° F.
Coolant temperature _____ 200° F.

| Lubricant compounded from SAE 30 solvent-extracted motor oil plus the indicated kind and amounts of improving agents | | | | | | Buda diesel engine test | |
|---|---|---|---|---|---|---|---|
| Lubricant No. | Metal complex of our invention | | | Additional improving agents | | Overall merit rating for piston [1] | Merit rating for top ring groove [2] |
| | product of— | percent addition on— | | Identity | percent addition, by weight | | |
| | | weight basis | sulfate ash basis | | | | |
| 24 | none (control) | | | none | | 40 | 4.9 |
| 25 | Example 6 | 5.49 | 1.27 | do | | 84 | 7.5 |
| 26 | Example 58 | 3.86 | 0.95 | improving agent A | 0.17 | 80 | 5.4 |
| | | | | improving agent B | 0.36 | | |
| | | | | improving agent C | 0.43 | | |
| 27 | Example 39 | 3.79 | 0.97 | improving agent A | 0.17 | 80 | 5.5 |
| | | | | improving agent B | 0.36 | | |
| | | | | improving agent C | 0.43 | | |

[1] Perfectly clean=100.
[2] Perfectly clean=10.

The test results given in the table above show the utility of our metal complexes in compounding lubricants which will perform well in diesel engines operating under severe service conditions.

Stability test data

The overbased materials described herein have been found to impart an unexpected degree of stability to lubricating compositions which contain the zinc salts of dithiophosphate acid esters and this stability is demonstrated by data obtained from storage tests at room temperature and 150° F. These tests consisted in storing samples for 30 days at the above temperatures. If any precipitate appears within that time, at either temperature, the sample is considered to be unstable. The unexpected stability of the combination of overbased materials and zinc salts of dithiophosphate acid esters is shown in the following table:

STABILITY TEST DATA

| Percent A | Percent B | | Percent A | Percent C | |
|---|---|---|---|---|---|
| 25 | 75 | unstable. | 20 | 80 | stable. |
| 29 | 71 | stable. | 25 | 75 | Do. |
| 33 | 67 | Do. | 33 | 67 | Do. |
| 36 | 64 | Do. | 40 | 60 | Do. |
| 40 | 60 | Do. | 50 | 50 | Do. |
| 50 | 50 | unstable. | 67 | 33 | Do. |

A—mixture of 40 mole-percent of zinc di-isopropyl dithiophosphate and 60 mole-percent of zinc di-(4-methyl-sec-amyl) dithiophosphate, 50 percent solution of mineral oil.
B—prior art basic barium petroleum sulfonate (Example 2).
C—overbased barium petroleum sulfonate of the present invention (Example 39).

In all of the foregoing examples which show the composition of finished lubricants containing the metal complexes of our invention, it is simple to discern the composition of the lubricant improving agent combinations employed in compounding said finished lubricants. All that is necessary in this respect, is to consider the weight percentages of the separate improving agents as parts by weight. For example, the lubricant improving agent corresponding to lubricant No. 26 would consist of 3.86 parts by weight of the product of Example 58 plus 0.17 part by weight of improving agent A, plus 0.36 part by weight of improving agent B, plus 0.43 part by weight of improving agent C. Where the metal complex of our invention is the sole improving agent present, it is obvious that no calculations are necessary.

In addition to being of utility in the preparation of improved crankcase lubricants, our metal complexes also find application in the preparation of extreme-pressure lubricants, such as, for example, gear lubricants.

The following tables give a number of specific examples of such lubricants:

GEAR LUBRICANTS [1] CONTAINING METAL COMPLEXES OF OUR INVENTION

[Compounded from SAE 90 grade gear base oil plus the indicated kinds and amounts of improving agents.]

| Lubricant No. | Improving agent of our invention | | | Additional improving agents | |
|---|---|---|---|---|---|
| | Product of— | percent addition on— | | | |
| | | weight basis | sulfate ash basis | identity | percent addition |
| 28 | Example 1 | 1.0 | 0.14 | chlorinated paraffin wax (40% chlorine) | 7.0 |
| | | | | chlorobenzyl disulfide | 3.0 |
| 29 | Example 3 | 0.2 | 0.052 | sulfurized lard oil (10% sulfur) | 6.0 |
| | | | | di-(4-methyl-sec-amyl) phosphite | 0.4 |
| | | | | benzyl disulfide | 1.5 |
| 30 | Example 7 | 0.4 | 0.14 | chlorinated paraffin wax (40% chlorine) | 4.0 |
| | | | | sulfurized methyl oleate (4% sulfur) | 3.0 |
| | | | | tert-butyl disulfide | 1.5 |
| | | | | di-(methyl-cyclohexyl) phosphite | 0.2 |
| 31 | Example 10 | 2.0 | 1.02 | lead naphthenate | 4.0 |
| | | | | n-amyl tetrasulfide | 2.5 |
| 32 | Example 32 | 0.1 | 0.023 | chlorinated diphenyl ether (50% chlorine) | 5.0 |
| | | | | tri-lauryl thionophosphate | 1.4 |
| | | | | mono-lauryl phosphite | 0.3 |
| 33 | Example 57 | 0.3 | 0.042 | chlorinated diisobutylene (50% chlorine) | 3.5 |
| | | | | n-hexyl disulfide | 1.2 |
| | | | | butyl toluene sulfonate | 0.3 |
| 34 | Example 47 | 0.5 | 0.12 | sulfurized oleic acid (8% sulfur) | 1.9 |
| | | | | di-lauryl phosphate | 0.5 |
| | | | | benzyl thiocyanate | 0.2 |
| 35 | Example 49 | 0.4 | 0.072 | chlorinated foots oil (30% chlorine) | 5.0 |
| | | | | phenyl disulfide | 2.0 |
| | | | | mono-n-hexyl phosphite | 0.1 |
| | | | | di-n-hexyl phosphite | 0.1 |

[1] The composition of the lubricant improving agent combinations corresponding to each of the lubricants can be discerned in the same manner exemplified earlier for crankcase lubricants.

In addition to the detergent compositions which may be used and which are described herein in detail, we may also use detergent compositions of the type described in the co-pending applications filed even date herewith.

The present application is a continuation-in-part of Serial No. 276,462, filed March 13, 1952, now Patent No. 2,616,905, and is related to applications Serial No. 216,101, filed March 16, 1951; Serial No. 216,102, filed March 16, 1951, now Patent No. 2,617,049; Serial No. 216,103, filed March 16, 1951, now Patent No. 2,616,924; Serial No. 224,458, filed May 3, 1951, now Patent No. 2,695,910; Serial No. 263,961, filed December 28, 1951, now Patent No. 2,616,925; Serial No. 263,962, filed December 28, 1951, now Patent No. 2,616,911; Serial No. 263,963, filed December 28, 1951, now Patent No. 2,616,904.

Other modes of applying the principle of the invention may be employed, change being made as regards the details described, provided the features stated in any of the following claims, or the equivalent of such be employed.

We therefore particularly point out and distinctly claim as our invention:

1. A lubricating composition comprising a major amount of lubricating oil and a minor amount of:

(a) an oil-soluble, organic, alkaline earth metal complex having the empirical formula:

$$Q-M_z(AO)_y(AI)_x$$

wherein:

Q=the hydrogen equivalent of the anions of an oilsalt of at least one organic sulphonic acid having at least 12 carbon atoms;

M=the hydrogen equivalent of at least one alkaline earth metal;

AO=the hydrogen equivalent of the anions of an organic alkaline earth metal aquasalt of at least one acid-reactive compound selected from the class consisting of phenolic compounds, enolizable organic compounds, lower molecular weight aromatic carboxylic acids, lower molecular weight organic thiophosphoric acids, lower molecular weight sulphonic acids, hydroxy aromatic compounds, and lower molecular weight hydroxy aromatic acids; which acid-reactive compound has an ionization constant in water of at least $1 \times 10^{-10}$ at 25° C., a water solubility at 50° C. of at least about 0.0005%, and in saturated aqueous solutions at about 25° C. a pH of less than 7;

AI=the hydrogen equivalent of the anions of at least one inorganic alkaline earth metal aquasalt having a water solubility of at least 0.0003% at 50° C.;

$z$=total equivalents of metal present in the complex;

$y$=total equivalents of AO in the complex;

$x$=total equivalents of AI in the complex;

and in which $z=y+x+1$, the ratio $x/y$ is at least 4.0 and $y$ is from 0.01 to 10; said organic, alkaline earth metal complex being present in an amount such as to provide in said lubricating composition a metal sulfate ash content ranging from 0.01 to 4%; and (b) the oil-soluble reaction product of a terpene with a phosphorus sulfide; said reaction product being present in an amount sufficient to improve the corrosion inhibiting properties of the lubricating composition.

2. A lubricating composition in accordance with claim 1 in which the terpene of component (b) is turpentine.

3. A lubricating composition in accordance with claim 1 in which the phosphorus sulfide of component (b) is phosphorus pentasulfide.

4. A lubricating composition in accordance with claim 1 in which component (b) is the oil-soluble reaction product of turpentine with phosphorus pentasulfide.

References Cited in the file of this patent

UNITED STATES PATENTS

| | | |
|---|---|---|
| 2,322,307 | Neely et al. | June 22, 1943 |
| 2,486,188 | May | Oct. 25, 1949 |
| 2,585,520 | Van Ess et al. | Feb. 12, 1952 |
| 2,594,795 | Neff | Apr. 29, 1952 |
| 2,619,460 | Neff | Nov. 25, 1952 |